United States Patent
Wandzura

(10) Patent No.: US 7,822,585 B2
(45) Date of Patent: Oct. 26, 2010

(54) SYSTEM AND A METHOD FOR NUMERICAL SIMULATION OF WAVE PROPAGATION IN HOMOGENEOUS MEDIA

(75) Inventor: Stephen Wandzura, Agoura Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 889 days.

(21) Appl. No.: 11/416,642

(22) Filed: May 3, 2006

(65) Prior Publication Data
US 2007/0043543 A1    Feb. 22, 2007

Related U.S. Application Data

(60) Provisional application No. 60/677,581, filed on May 3, 2005.

(51) Int. Cl.
*G06F 7/60*    (2006.01)
*G06G 7/56*    (2006.01)
(52) U.S. Cl. .................. 703/2; 703/5; 703/13
(58) Field of Classification Search .......... 703/13, 703/2, 5
See application file for complete search history.

(56) References Cited

U.S. PATENT DOCUMENTS 6,005,916 A * 12/1999 Johnson et al. ............... 378/87
2003/0003054 A1 * 1/2003 McDonald et al. ......... 424/9.36

* cited by examiner

*Primary Examiner*—Paul L Rodriguez
*Assistant Examiner*—Andre Pierre Louis
(74) *Attorney, Agent, or Firm*—Tope-McKay & Assoc.

(57) ABSTRACT

The present invention provides a method to construct stable, high-order explicit discretization for the wave equation based on the discretization of the evolution formula. The present invention provides independent computation of discretization in one, two, or more spaces for bulk propagation, near boundaries propagation, and discretization of a projection operator to enforce boundary conditions. More specifically, the method includes an act of discretizing propagation operators $L_{\Delta t}$ by using an identity that is derived using central differencing in time. The method also includes an act of providing a high-order discretization of a boundary projection operator that enforces boundary conditions independent of the discretization of the propagation operators $L_{\Delta t}$. Additionally, the method includes an act of alternating an application of a discretization of an evolution formula having a spatial filtering operator $L_0$ with a boundary projection operation for stepping forward in time to determine wave propagation in the media.

36 Claims, 7 Drawing Sheets

SYSTEM AND A METHOD FOR NUMERICAL SIMULATION OF WAVE PROPAGATION IN HOMOGENEOUS MEDIA

PRIORITY CLAIM

The present application is a non-provisional application, claiming the benefit of priority of U.S. Provisional Application No. 60/677,581, filed on May 3, 2005, entitled, "A System and a Method for Numerical Simulation of Wave Propagation in Homogenous Media."

STATEMENT OF GOVERNMENT INTEREST

This invention relates to work performed in contract with the U.S. Government under contract number MDA972-01-C-0006, titled "Advanced Electromagnetic Modeling," where the U.S. Government may have certain rights in this invention.

BACKGROUND OF THE INVENTION (1) Field of the Invention

This invention relates to time-domain simulation of the wave equation and, in particular, to a method and a system to compute an evolution of the wave equation.

(2) Description of Related Art

In one dimension, the derivative of a point on a line is the slope of that line at that point. The slope at any point on a line is the tangent line through a particular point, which has the same direction as the line at that point. In other words, the derivative of a point on a line is construed as a local statement about the local change in the direction of the line. The partial differential equation of a function with four variables is defined in much the same way, by using a tangent to a three dimensional function in a way analogous to the way tangent line is used for a single variable function. Partial differential equations may be used to represent a particular point of a field in space and time. The slope (derivative) of a field at which any one point exists depends on the three variables for space in x, y, and z directions and one variable for time t. Therefore, partial differential equations can be construed as local statements about local changes in a three dimensional entity, such as a wave, in space and time.

The wave Equation (1) is represented by a partial differential equation because it involves a function of four variables, which are the three dimensions of space in the x, y, and z directions and one variable for time t as follows, $$\left(\nabla^2 - \frac{\partial^2}{\partial t^2}\right)\psi(\vec{x}, t) = 0, \quad (1)$$

where:

$$\nabla^2 = \frac{\partial^2}{\partial x^2} + \frac{\partial^2}{\partial y^2} + \frac{\partial^2}{\partial z^2}$$

denotes the well-known Laplace operator, $\psi(\vec{x}, t)$ is the field quantity, and $\vec{x}$=dimensions of space in x, y, and z directions.

Wave fields are continuous entities in both space and time, which means that they have a value at every point in space and time. This makes the use of partial differential equations for an exact representation of a field at every point in space and time impractical and difficult because an infinite number of points must be used to provide an exact representation of the total field at every point in space and time. Other analyzing techniques must therefore be used to avoid the use of partial differential equations for representing a continuous entity such as a wave.

Numerical Analysis is one method for computing a solution for partial differential equations. This is done by first discretizing a partial differential equation, bringing it into a finite dimensional subspace, then solving the resulting linear system in the finite dimensional subspace. One such technique for first discretizing the wave Equation (1) involves using a finite differencing method. This method approximates the solution of partial differential equations by using a finite collection of points to represent a wave. The approach taken for partial differential equations is to approximate differential operators such as u'(x) by a difference operator such as (u(x+h)−u(x))/h for some small but finite h, where h may represent a small rate of change Δ. Doing this substitution for a sufficient number of points in the domain of definition (for instance 0, h, 2h ... 1 in the case of the unit interval) provides a system of equations that can be solved algebraically.

The process of representing a continuous entity by a finite collection of points is known as discretization. In other words, discretization is a way of approximating a problem that has an infinite number of variables with a problem that has a finite number of variables. A discretization process divides geometry into smaller pieces (finite elements) to prepare for analysis. A discretized model of a continuous entity such as a wave can be manipulated using an analyzing technique such as a Finite-Difference Time-Domain (FDTD), in which all the simple geometric components of a model are evaluated simultaneously. To apply the FDTD, the differential equation of the wave is replaced by a finite difference equation. This is done by replacing the partial derivatives by central difference quotients, which replaces partial differential equations with algebraic expressions. In the next operations, the interval to be computed is subdivided into a suitable number of equal subintervals, and then the difference equation at each point where the value of the function is unknown is determined. At the final operation, the system of equations created is solved to obtain approximation values for the solution of the differential equation at discrete points on the interval.

Using FDTD, at a given position in space, the field at each current step can be calculated from the previous values of the fields (hence the difference in time). If time is considered discretized into discrete steps, then fields are simply increased or decreased from their previously calculated values by adding or subtracting an amount given by the calculations at current time. The partial differential equations, which describe the infinitesimal local behavior of the field, are replaced with algebraic equations having to do with differences in the field in nearby space and time points. This avoids the partial differential operations because the equations are transformed into algebraic expressions. Dividing a real problem into appropriately-sized unit cells, and then calculating the field equations, iterated for as long as the response is of interest, therefore solves a real problem.

To use FDTD, a computational domain, which is the space in which the simulation of a wave will be performed, must be established. The field will be determined at every point within the computational domain, requiring a cell or grid structuring of the domain. In addition, since a computational domain must end at some point, a boundary must be established. Once the computational domain is determined, a source is then specified. The source can be an impinging plane wave or a current on a wire, depending on the type of situation to be modeled.

Since FDTD requires that the entire computational domain be formed of grids, and because these grids must be small compared to the smallest wavelength and smaller than the smallest feature model, very large computational domains can be developed, which result in very long solution times. Models with long, thin features are difficult to model in FDTD because of the excessively large computational domain required. In addition, although fields can be found directly everywhere in the computational domain when using FDTD, if, however, calculations or models of fields at some distance are desired, it is likely that the distance will force the computational domain to be excessively large. It should be noted that far-field extensions are available for FDTD, but require some amount of post-processing.

As is described in the Published Patent Application 2002/0099510 to Namiki, portions of which are repeated herein for completeness, conventionally, FDTD solutions are numerically obtained through explicit methods. For simplicity, consider the following one-dimensional parabolic partial differential equation, $$\frac{\partial f}{\partial t} = \frac{\partial^2 f}{\partial x^2}. \quad (2)$$

Equation (2) may be discretized with central difference approximations taken for the derivatives of time t and space x, $$f(t,x)=f(n\Delta t, i\Delta x)=f_i^n. \quad (3)$$

The Equation (3) indicates that $f$ is a function of time t and position x, where t and x are discretized as $n\Delta t$ and $i\Delta x$, respectively. The temporal steps are indexed by some integer n and related to the continuous time by the relation $t=n\Delta t$, and spatial steps are indexed by another integer i and related to continuous space (e.g., in the x direction) by the relation $x=i\Delta x$. Therefore, n is the number of time steps that have elapsed from the beginning of computation, $\Delta t$ is the temporal discretization interval (i.e., time step size), i is the grid coordinate number representing a specific point in the one-dimensional space, and $\Delta x$ is the spatial discretization interval (i.e., space increment or cell size). To yield a solution by using an explicit method, the above differential equation is approximated to the following forward-difference expression with respect to its time derivative, $$\frac{f_i^{n+1} - f_i^n}{\Delta t} = \frac{f_{i+1}^n - 2f_i^n + f_{i-1}^n}{\Delta x^2}. \quad (4)$$

Let $$r = \frac{\Delta t}{\Delta x^2},$$

then Equation (4) can be rewritten as follows, $$f_i^{n+1}=rf_{i+1}^n+(1-2r)f_i^n+rf_{i-1}^n. \quad (5)$$

Note that, when a solution at time $n\Delta t$ is given, Equation (5) immediately gives the next solution at time $(n+1)\Delta t$. Numerical solvers of this kind are referred to as explicit methods.

The explicit difference method of the Equation (5), however, must satisfy the following condition for stability to make sure that the solution will converge toward a final solution, $$r = \frac{\Delta t}{\Delta x^2} \leq \frac{1}{2}. \quad (6)$$

Furthermore, to avoid numerical instability in FDTD computation, the following condition should be satisfied, which is known as the Courant, Friedrich, and Levy (CFL) condition, or Courant condition, $$\Delta t \leq \frac{1}{v\sqrt{\left(\frac{1}{\Delta x_{\min}}\right)^2 + \left(\frac{1}{\Delta y_{\min}}\right)^2 + \left(\frac{1}{\Delta z_{\min}}\right)^2}}. \quad (7)$$

Detailed discussion on the CFL condition in FDTD is found in the literature, as described by A. Taflove, in "Computational Electrodynamics," MA, Artech House Inc., 1995. The Equation (7) is known as the Courant condition for three-dimensional wave analysis, where v is the propagation rate of electromagnetic waves, and $\Delta x_{min}$, $\Delta y_{min}$, and $\Delta z_{min}$ are minimum values of spatial discretization intervals in the x, y, and z directions, respectively. Because of the constraints discussed above, the maximum time-step size in explicit methods is dependent on the minimum cell size. That is, the time-step size must be reduced when analyzing an object having fine geometrical features, resulting in an increased number of simulation steps to be iterated. This would cause a serious problem of long simulation time, particularly when calculating a time response for an extended period.

Partial differential equations can be solved with explicit as well as implicit methods. For example, a backward difference approximation to the one-dimensional parabolic partial differential Equation (2) is as follows, $$\frac{f_i^{n-1} - f_i^n}{\Delta t} = \frac{f_{i+1}^{n+1} - 2f_i^{n+1} + f_{i-1}^{n+1}}{\Delta x^2}. \quad (8)$$

Similar to the case of explicit methods mentioned above, by allowing $$r = \frac{\Delta t}{\Delta x^2},$$

the difference Equation (8) can be rearranged as follows, $$-rf_{i+1}^{n+1}+(1-2r)f_i^{n+1}-rf_{i-1}^{n+1}=f_i^n. \quad (9)$$

Equation (9) is an implicit expression of the problem to be solved. Unlike the explicit methods, the numerical stability is guaranteed when solving this implicit expression. In the implicit method, however, it is necessary to solve the following set of simultaneous equations in order to obtain a series of $f_i^{n+1}$, $$\begin{pmatrix} b_1 & c_1 & & & & \\ a_2 & b_2 & c_2 & & 0 & \\ & & \ddots & & & \\ & & & \ddots & & \\ & 0 & & a_{imax-1} & b_{imax-1} & c_{imax-1} \\ & & & & a_{imax} & b_{imax} \end{pmatrix} \begin{pmatrix} f_1^{n+1} \\ f_2^{n+1} \\ \vdots \\ f_{imax-1}^{n+1} \\ f_{imax}^{n+1} \end{pmatrix} = \begin{pmatrix} f_1^n \\ f_2^n \\ \vdots \\ f_{imax-1}^n \\ f_{imax}^n \end{pmatrix}, \quad (10)$$

where $a_i$ is the invariable part $(-r)$ of the third term of the left-hand side of Equation (9) when $i=1, 2 \ldots$ imax, $b_i$ is the invariable part $(1+2r)$ of the second term of the left-hand side of Equation (9) when $i=1, 2, \ldots$ imax, and $c_i$ is the invariable part $(-r)$ of the first term of the left-hand side of Equation (9) when $i=1, 2, \ldots$ imax.

To analyze the transient behavior of electromagnetic waves, it is required to solve a partial differential equation in the space of at least two dimensions. Special care must be taken when solving this kind of problem by use of implicit methods. Consider the following two-dimensional partial differential equation, $$\frac{\partial f}{\partial t} = \frac{\partial^2 f}{\partial x^2} + \frac{\partial^2 f}{\partial y^2}. \quad (11)$$

To solve Equation (11) with, for example, the well-known Crank-Nicolson method, its time-derivative term is approximated as follows:

$$\frac{f_{i,j}^{n+1} - f_{i,j}^n}{\Delta t} = \frac{1}{2} \frac{f_{i+1,j}^n - 2f_{i,j}^n + f_{i-1,j}^n}{\Delta x^2} + \frac{f_{i,j+1}^n - 2f_{i,j}^n + f_{i,j-1}^n}{\Delta y^2} + \quad (12)$$
$$\frac{1}{2} \frac{f_{i+1,j}^{n+1} - 2f_{i,j}^{n+1} + f_{i-1,j}^{n+1}}{\Delta x^2} + \frac{f_{i,j+1}^{n+1} - 2f_{i,j}^{n+1} + f_{i,j-1}^{n+1}}{\Delta y^2}.$$

The solution of Equation (12) can be reached by solving a set of simultaneous linear equations having as many unknowns as $(Nx-1) \times (Ny-1)$, where Nx and Ny are the numbers of meshes in the x-axis and y-axis directions, respectively. This computation makes extreme demands on the computer memory and processing power, even when fine meshing is required. The result is that implicit methods are as time-consuming as explicit methods, even when the simulation model has a fine geometrical feature that needs a smaller cell size.

There are two main issues with respect to performance of a numerical solution of the wave equations, stability and efficiency. The numerical stability of a method describes how that method responds to the differences between the calculation and the function being approximated. In a stable method, the errors due to the approximations are damped out as the computation proceeds. In an unstable method, any errors in processing are magnified as the calculation proceeds. Unstable methods quickly generate worthless data, and are useless for numerical processing. Therefore, any method used to compute the approximate solution of a wave equation must be stable.

The second issue is with respect to the efficiency in the numerical solutions of partial differential equations, which relates to the precision of the approximated solution. Recall that numerical solutions are mere approximations of the partial differential equations, and hence, the error between the approximate solution and the true solution must somehow be accounted for to determine the precision of the approximation. For example, is the approximation error small enough that it provides an acceptable solution for which the partial equations were modeled? In general, the error between the approximate solution and the true solution is determined by the truncation error that is made by going from a differential operator to a difference operator. The truncation error reflects the fact that a difference operator can be viewed as a finite part of the infinite series of the differential operator. Therefore, in general, a higher number of series (an increased number of steps or values closer together in space and time) can be used in the numerical solution to better approximate the partial differential equation to reduce the approximation error. In fact, the approximation error should reduce to zero if enough points in space and time are used to approximate the solution to the partial differential equations, which is the definition of convergence for an infinite series.

Assuming that the method is convergent, then a determination must be made as to how rapidly the approximation error reduces to zero (or the solution converges), which is the measure of the efficiency of the method being used. Most of the methods that are used today are low-order discretization methods, which means that the approximation error is decreased by a very low factor despite an increased use of points (numbers) in space and time. Discretizations with approximation errors that reduce rapidly as more points are used are known as high-order discretization methods.

The difficulty in changing a low-order time-domain simulation to a high-order one is that, in general, the low-order time-domain simulations tend to be unstable high-order solutions. Another difficulty is that in order to achieve a high-order solution, the algebraic equations that replace the partial differential equations would have to relate to the values of the field at many steps (time and or space). One major problem with this is initialization. For example, if the value of a previous four time steps are needed, then initial conditions for the four time steps are required, and not just one. On the other hand, the more time steps that are required, the greater the possibility of introducing extraneous and unstable solutions.

In light of the current state of the art and the drawbacks to current systems mentioned above, a need exists for a system and a method that would allow for stable, high-order discretization for evolution of the wave equation.

BRIEF SUMMARY OF THE INVENTION

The present invention provides a method for causing a processor to perform acts for numerical simulation of wave propagation in a media. For example, the method includes an act of discretizing propagation operators $L_{\Delta t}$ by using an identity that is derived using central differencing in time. The method also includes an act of providing a high-order discretization of a boundary projection operator that enforces boundary conditions independent of the discretization of the propagation operators $L_{\Delta t}$. Additionally, the method includes an act of alternating an application of a discretization of an evolution formula having a spatial filtering operator $L_0$ with a boundary projection operation for stepping forward in time to determine wave propagation in the media.

In another aspect, the act of discretizing the propagation operator $L_{\Delta t}$ further comprises the acts of:

selecting a set of suitable functions for which discretization of the propagation operator $L_{\Delta t}$ is exact;

determining a minimum stencil size M for which a free-space discretization is stable;

selecting discretization points in a spatial domain S on a regular lattice;

classifying the discretization points as either bulk points or border points, with the bulk points being those for which each point on a stencil of the propagation operator corresponds to a discretization point on the lattice, and border points are those points that remain;

computing a discretization of the propagation operator for each of the border points using the border point and its neighbor points;

selecting points on a boundary, and using neighboring discretization points, computing differentiators and extrapolators to the selected points on the boundary for a selected boundary condition; and decomposing an outer product of constraint vectors for efficient application of the projection operator.

Additionally, the act of selecting a suitable function set for which discretization of the propagation operator $L_{\Delta t}$ is exact further comprises an act of selecting polynomials of degrees not exceeding a value d, where d is a degree of the polynomial.

In another aspect, the act of determining a minimum stencil size M for which a free space discretization is stable further comprises an act of setting M to a value greater than or equal to the number of linearly independent polynomials in spatial coordinates that are of degree not exceeding d, where M is a minimum stencil size; and d is a degree of a polynomial.

In yet another aspect, the act of selecting discretization points in a spatial domain S on a regular lattice further comprises an act of selecting points such that they are on a lattice selected from a group consisting of a square lattice and a triangular lattice.

The present invention further comprises an act of discretizing the propagation operator $L_{\Delta t}$ for each bulk point according to the following:

$$(L_{\Delta t}\psi)(x, y, t) \approx \sum_{ij} \hat{L}_{ij}(\tau)\psi(x + i\Delta x, y + j\Delta x, t),$$

where $(L_{\Delta t}\psi)(x, y, t) \equiv L_{\Delta t}(x, y, t)[\psi(x, y, t)]$;

$L_{\Delta t}(x, y, t)$ is a propagation operator in space and time dimensions;

$\psi(x, y, t)$ is a field operand in two dimension spaces, and one time dimension;

$\hat{L}_{ij}(\tau)$ is a discretized propagation operator, which is set to M numbers, which are values of numbers to provide symmetry with respect to any selected point i,j on a grid, with $\tau = \Delta t/\tau x$;

$\psi(x+i\Delta x, y+j\Delta x, t)$ is a discretized field $\psi(x, y, t)$ in two dimensions of space;

$i\Delta x$ is a first spatial coordinate in a first direction, where i is an integer valued first grid coordinate number representing a specific point in a bulk region;

$j\Delta x$ is a second spatial coordinate in second direction, where j is an integer valued second grid coordinate number representing the specific point in a bulk region; and $\Delta x$ is a spatial discretization interval.

Additionally, the act of computing a discretization of the propagation operator for each of the border points further comprises an act of computing a discretization according to the following:

$$(L_{\Delta t}\psi)(x_b, y_b) \approx \sum_{neighbors(x,y)} \hat{L}_{ij}(x_b, y_b)\psi(x, y)$$

where:

$(L_{\Delta t}\psi)(x_b, y_b)$ is the field resulting from the application of the propagation operator evaluated at the border point $(x_b, y_b)$;

$L_{\Delta t}(x, y)$ is a propagation operator in two dimension spaces x and y;

$\psi(x, y)$ is a field operand in two dimension spaces x and y, which acts as an operator for the operand $(x_b, y_b)$;

$x_b$ is a border point in a first dimension;

$y_b$ is a border point in a second dimension;

x and y are neighbor points of the border points $x_b$ and $y_b$;

$\hat{L}_{ij}(x_b, y_b)$ is a discretized propagation operator at border points; and $\psi(x, y)$ is a representation of a field in two dimension space for neighbor points x, y.

In another aspect, the present invention further comprises an act of discretizing boundary conditions according to the following:

$$\sum_i b_{li}\psi(\vec{x}_i) = c_l,$$

where:

$b_{li}$ are an expression of boundary conditions;

$\psi(\vec{x}_i)$ represents tabulation of a field at discretization points $\vec{x}_i$ on the boundary;

$c_l$ represents a homogeneous boundary condition if equal to zero, and non-homogeneous boundary condition otherwise;

l labels points on the boundary; and i labels points near the boundary.

In yet another aspect, the act of decomposing an outer product of constraint vectors for efficient application of the projection operator further comprises an act of decomposing the outer product according to the following:

$B_{lm} = \Sigma b_{li} b_{mj}$, where:

$B_{lm}$ is an coefficient matrix; and $b_{li}$ is an expression of the boundary conditions.

Additionally, the act of decomposing an outer product of constraint vectors for efficient application of the projection operator, further comprises an act of applying the projection operator to a particular vector $\psi$ by solving for coefficient $\alpha_l$ according to the following:

$$\sum_m B_{lm}\alpha_m = c_l - \sum_i b_{li}\psi(\vec{x}_i),$$

and making a replacement according to the following:

$$\psi(\vec{x}_i) \leftarrow \psi(\vec{x}_i) + \sum_l \alpha_l b_{li}.$$

In yet another aspect, the act of discretizing propagation operators $L_{\Delta t}$ by using an identity further comprises an act of using the identity of $$\frac{1}{2}[\psi(\vec{x}, \Delta t) + \psi(\vec{x}, \Delta t)] = L_{\Delta t}\psi(\vec{x}, 0)$$

$$\equiv \cosh\sqrt{(\Delta t)^2 \nabla^2} \, \psi(\vec{x}, 0)$$

$$= \sum_{m=0}^{\infty} \frac{(\Delta t)^{2m}\nabla^{2m}}{(2m!)} \psi(\vec{x}, 0);$$

where an exact relation that relates fields $\psi(\vec{x},t)$ at multiple times without approximations is provided;
wherein the act of providing a high-order discretization of a boundary projection operator further comprises an act of using the boundary projection operator of $\psi(\vec{X},t) \leftarrow P_b \psi(\vec{X},t)$; and wherein alternating an application of a discretization of an evolution formula having a spatial filtering operator $L_0$ further comprises an act of using the spatial filtering operator $L_0$ of $\psi(\vec{X},\Delta t)=2L_{\Delta t}\psi(\vec{X},\Delta t)-L_0\psi(\vec{X},t-\Delta t),$ with a boundary projection operation for stepping forward in time to determine wave propagation in the media; where $$\nabla^2 = \frac{\partial^2}{\partial x^2} + \frac{\partial^2}{\partial y^2} + \frac{\partial^2}{\partial z^2}$$

denotes Laplace operator, $\psi(\vec{X}, \Delta t)$ is a field quantity,
$\vec{X}$ is dimensions of space in x, y, and z direction,
$\Delta t$ is an increment of time,
m is an index of summation,
$L_0$ is a high-order spatial filtering operator, and
$P_b$ is the boundary projection operator at a boundary b.

Finally, the present invention also includes a computer program product and system configured to cause a processor to perform operations of the method described herein.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention.

Referring to the drawings in which like reference character(s) present corresponding parts throughout.

Figure 1:
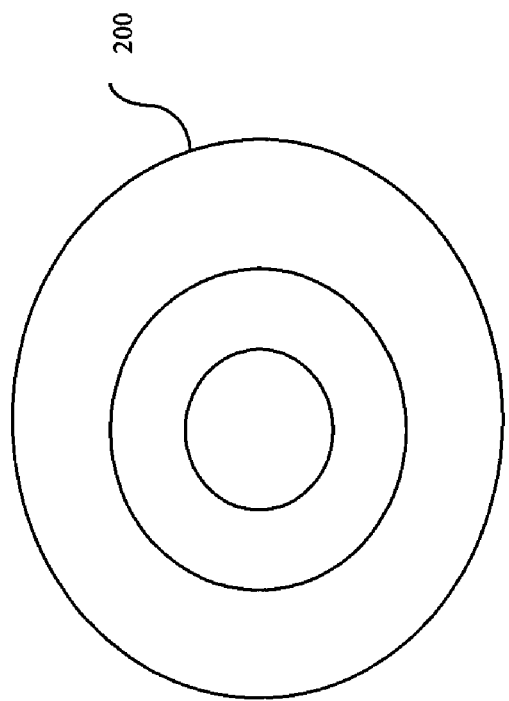
FIG. 1 is an exemplary illustration of a data processing system in accordance with the present invention.

DETAILED DESCRIPTION OF THE INVENTION (1) Introduction

In general, there are three known methods to handle the time evolution of the wave equation. The first uses discretization of the spatial derivatives along with an ordinary differential equation solver such as the well-known Runge-Kutta. The second method discretizes all the derivatives similarly, which results in a system of equations that relate the field(s) at several times. The third uses the well-known Lax-Wendroff method, based on the following identity Equation (13), and is usually implemented using some finite difference approximations to powers of $\nabla^2$:

$$\frac{1}{2}[\psi(\vec{x}, \Delta t) + \psi(\vec{x}, \Delta t)] = L_{\Delta t}\psi(\vec{x}, 0) \qquad (13)$$

$$\equiv \cosh\sqrt{(\Delta t)^2\nabla^2} \, \psi(\vec{x}, 0)$$

$$= \sum_{m=0}^{\infty} \frac{(\Delta t)^{2m}\nabla^{2m}}{(2m!)} \psi(\vec{x}, 0);$$

$$= \sum_{m=0}^{\infty} \frac{(\Delta t)^{2m}\nabla^{2m}}{(2m!)} \psi(\vec{x}, 0). \qquad (14)$$

The wave Equation (1) satisfies the above identity at three equally-spaced times. The third method arrives at an exact relation that relates the field(s) at multiple times, and is concerned with various integral representations of the linear propagation operator $L_{\Delta t}$ in one, two, and three space dimensions that can be stable and high-order. With this method, an integral relation equation form is used in the wave equation rather than the partial differential equation form. This enables the exact representation of a field in three time slots. These integral equations are without any approximations or discretization of fields. Hence, fields are represented in discrete times, but are continuous in space with no approximations. Detailed descriptions of this third method are found in the Journal of Computational Physics, 162 (2000), pages 536-543, by Alpert et al., titled "An Integral Evolution Formula for the Wave Equation," the entire disclosure of which is incorporated herein by reference, and herein after referred to as "Alpert et al."

The present invention constructs a stable, high-order, explicit discretization for the wave equation, i.e., one that has a discretization error that decreases rapidly with discretization density. The present invention provides an approximation of the fields in space for the exact representation of the fields in time. In other words, using the Alpert et al. approach of equations that are exact in discrete time, the present invention provides an approximation of those exact equations in space.

The present invention further provides a prescription for handling boundary conditions, which separates the bulk (the propagation region) from the boundary, independent of each other, and includes the enforcement (projection) of solutions to obey the boundary conditions without compromising the stability or the high order convergence of the discretization. In other words, the present invention separates the process of computing the evolution of the wave in space and time in a propagation region from that evolved at the boundary region. That is, first the evolution of the wave in the propagation region is computed in some space s and time t, and then computations are made to correct the solutions at the boundaries. Then at the next (s+Δs) space and (t+Δt) time, the evolution of the wave in the propagation region is computed again, and then computations are made to correct the solutions at the boundaries for the (s+Δs) space and (t+Δt) time. This process is iterated for the desired number of space and time steps Δ. In addition, the step size may be selected to be $(\Delta)^n$. This means that the approximation error will reduce very rapidly, as finer resolutions of space and time are used. The present invention further provides an explicit prescription that handles evolution of a field near boundary regions, independent of the boundary and boundary conditions for stable, and high-order discretization.

Before providing details regarding various methodologies of the invention, first a glossary of terms is provided as a reference for the reader. Next, a system overview is provided, describing the interconnection and operation of various major components of a system in accordance with the present invention. After the system overview, a data processing system overview is presented to acquaint the reader with the various components typically found in a data processing system that may be used in conjunction with the present invention. Next, an explication section is provided in which the various major components presented in the system overview are described in detail. Finally, a results section is provided, which presents non-limiting examples of the operation of the present invention (in two space dimensions plus a time dimension) in order to provide a more tangible understanding of the operation of the invention.

(2) Glossary

This section presents an exemplary glossary of some of the terms used in the description and claims. The glossary is intended to provide the reader with a general understanding of various terms as they are used in this disclosure, and is not intended to limit the scope of these terms. Rather, the scope of the terms is intended to be construed with reference to this disclosure as a whole and with respect to the claims below. Further, the definitions provided should not be considered limiting to the extent that the terms are known in the art. These definitions are provided to assist in the understanding of the present invention.

Border Propagation Region—Border propagation region refers to the evolution of the wave in space and time in a propagation region "near" the boundaries of the computational domain. "Near" means that there are not enough regular (or bulk) mesh points to use the bulk propagation stencil.

Boundary Condition—Boundary Conditions (BCs) are linear constraints on the field at the boundaries of the computational domain.

Boundary Projection Operator—Fields are not uniquely defined by a partial differential equation, specification of BCs is necessary. A boundary projection operator is a projection operator onto the subspace of fields obeying the BCs.

Bulk Propagation Region—Bulk propagation region refers to the evolution of the wave in space and time in a propagation region away from the boundaries of the computational domain. In other words, it is the region in which the wave field propagates as in a homogeneous regular lattice without boundaries.

Computational Domain—Computational domain is the space in which the simulation of a wave will be performed.

Computational Efficiency—The efficiency of a method is determined by the computational expense of reducing the approximation error. This efficiency is quantified by discretization order.

Dirichlet Boundary Condition—The Dirichlet boundary condition states that a field vanishes on the boundary of a propagation region.

Discretization—Approximating the solution of a continuous problem by representing it in terms of a finite number of variables.

Discretization Order—Discretization order measures the rate at which approximation error decreases as more variables are used to approximate the wave field.

High-Order Discretization Method—High-order discretization methods are those where approximation errors reduce rapidly as more points (numbers) are used in space and time.

Homogeneous Boundary Condition—A homogeneous boundary condition is one where some linear combination of the field and its derivatives vanish on the boundary.

Inhomogeneous Boundary Condition—A inhomogeneous boundary condition is one where some linear combination of the field and its derivatives must equal some specified non-zero function on the boundary.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive.

Linear Propagation Operator—A linear propagation operator is the operator that gives the field in terms of the field at previous times.

Low-Order Discretization Method—Low-order discretization methods are those where the approximation error decreases slowly as a function of the space-time density of discretization points.

Near Boundary Propagation Region—Near boundary propagation region refers to the evolution of the wave in space and time in a propagation region near the boundaries of the computational domain.

Neumann Boundary Condition—The Neumann boundary condition states that the normal derivative of a field vanishes at the boundary of a computational domain.

Numerical Stability—Numerical stability describes how a method of computation responds to the differences between the calculations and the function being approximated. In a stable method, the errors due to the approximations are damped out as the computation proceeds. In an unstable method, any errors in processing are magnified as the calculation proceeds.

Spatial Steps—Spatial steps are discretized space steps, and are indexed by some integer i and related to continuous space (e.g., in the x-direction) by the relation $x=i\Delta x$. The integer i is the grid coordinate number (in the lattice) representing a specific point in the one-dimensional space, and $\Delta x$ is the spatial discretization interval, which is the space increment or cell size in the lattice.

Temporal Steps—Temporal steps are discretized time steps, and are indexed by some integer n and related to the continuous time by the relation $t=n\Delta t$. The integer n is the number of time steps that have elapsed from the beginning of computation, and $\Delta t$ is the temporal discretization interval, which is the time step size.

Truncation Error—The truncation error reflects the fact that a difference operator can be viewed as a finite part of an infinite series expansion of the differential operator. Therefore, in general, more terms (an increased number of steps or values closer together in space and time) can be used in the numerical solution to better approximate the partial differential equation to reduce truncation error, and hence, the approximation error.

(3) System Overview

Using the well-known Lax-Wendroff method, which is based on the identity Equation (13), the present invention uses an exact relation that relates the fields at multiple times as taught by Alpert et al., but discretizes the linear propagation operator $L_{\Delta t}$ that appears at each discrete time rather than an integral representation thereof. Hence, the present invention discretizes the linear propagation operator $L_{\Delta t}$, and not the integral representation from which the linear propagation operator $L_{\Delta t}$ is derived. In other words, the present invention uses the Alpert et al. evolution formula to provide an exact representation of a wave equation at discrete times, and then discretizes the space within each discretized time. This approach provides a hierarchy of discretizations that can be obtained by representing the linear operator $L_{\Delta t}$ to the desired order. The present invention recognizes that Equation (13) provides an explicit formula for $\psi(\vec{x},\Delta t)$ in terms of $\psi(\vec{x},0)$ and $\psi(\vec{x},-\Delta t)$, meaning that no linear equations need be solved to compute $\psi(\vec{x},\Delta t)$:

$$\psi(\vec{x},\Delta t)=2L_{\Delta t}\psi(\vec{x},0)-\psi(\vec{x},-\Delta t). \quad (15)$$

Therefore, the present invention provides a prescription for an explicit discretization of Equation (13) in multi-space dimensions, along with a projection operator that enforces the desired boundary conditions. An important feature of the present invention is the independent computation of three discretizations, one for bulk (away from boundaries) propagation, one for propagation near boundaries, and a projection operator to enforce boundary conditions.

Features of the present invention include a straight-forward discretization of the linear propagation operator $L_{\Delta t}$, a high-order discretization of a projection operator that enforces the desired boundary conditions independently of the discretization of the propagation operator $L_{\Delta t}$, and a consistent discretization of the implicit identity operation on the first "time slice" $\psi(\vec{x},-\Delta t)$ on the right hand side of Equation (15). In other words, the present invention applies a high-order filter to the field $\psi(\vec{x},-\Delta t)$. This is essential to preserve stability. Another feature includes the applicability of the methodologies of the present invention to both structured and unstructured meshes. It should be noted that the efficiency of the method presented depends on a regular mesh being used in as much of the modeled volume as possible.

With the present invention, the evolution of the field steps forward in time by alternating the application of the discretization of the evolution formula (Equation (15)) with the identity operator exhibited, $$\psi(\vec{x},t+\Delta t)=2L_{\Delta t}\psi(\vec{x},t)-L_0\psi(\vec{x},t-\Delta t), \quad (16)$$

with the boundary projection operation, $$\psi(\vec{x},t) \leftarrow P_b\psi(\vec{x},t), \quad (17)$$

where $P_b$ is the projection operator (the boundary condition), that enforces the desired boundary condition independently of the discretization of the linear propagation operator $L_{\Delta t}$ on the field $\psi$. In other words, portions of the field $\psi$ that do not obey the boundary conditions are removed (filtered) from the field by the application of the projection operator $P_b$. It should be noted that discretizing the implicit linear 0-time operator $L_0$ by the same prescription as is used for the linear propagation operator $L_{\Delta t}$ results in a low-pass spatial filter that facilitates stability. The notation for the 0-time propagation (spatial filtering) operator $L_0$ is not arbitrary because $L_0$ is exactly the $\Delta t \rightarrow 0$ limit of $L_{\Delta t}$, and likewise for their discretizations. All the methods may be processed by the exemplary data processing systems described in details below.

(4) Data Processing System Overview

Figure 2:
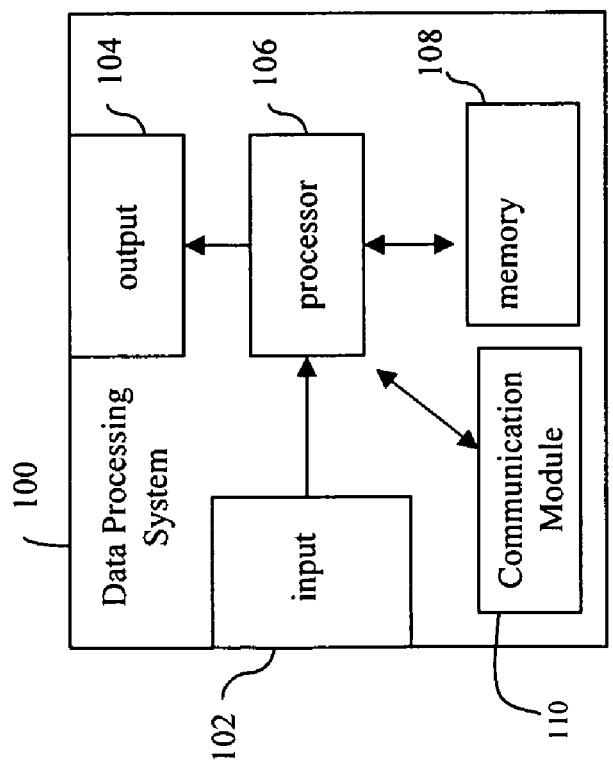
FIG. 2 is an exemplary illustration of a data storage unit (medium) in accordance with the present invention.

A block diagram depicting the components of a computer system used in the present invention is provided in FIG. 1. The data processing system 100 comprises an input 102 for receiving data input signals from any inputting mechanism, non-limiting examples of which include an external computer connected to the system 100, an Internet connection, or any computer readable medium 200 (illustrated in FIG. 2) such as a floppy disk, Compact Disk (CD), a Digital Versatile Disk/Digital Video Disk (DVD), and a removable hard drive. The input 102 may, also be configured for receiving user input from another input device such as keyboard, a mouse, or any other input device best suited for the current environment conditions. Note that the input 102 may include multiple "ports" for receiving data and user input, and may be configured to receive information from remote databases using wired or wireless connections. The output 104 is connected with the processor 106 for providing output to the user, possibly through a video display. Output 104 may also be provided to other devices or other programs, e.g. to other software modules, for use therein, possibly serving as a wired or wireless gateway to external databases or other processing devices. The input 102 and the output 104 are both coupled with a processor 106, which may be a general-purpose computer processor or a specialized processor designed specifically for use with the present invention. The processor 106 is coupled with a memory 108 to permit storage of data and software to be manipulated by commands to the processor.

(5) Explications

The discussion section is divided into two major sections with section (I) providing a description for a stable, high-order discretization for evolution of the wave equation in one space and one time dimension, and a section (II) that extends the approach of section (I) to two or more space dimensions plus the time dimension.

(I) One Space and One Time Dimension (1+1)

The discussion for the stable, high-order discretization for evolution of the wave equation in one space and one time dimensions provides a description for (A) Field Propagation in the Bulk (including stability), (B) Field Propagation Near Boundaries, (C) Enforcement of Boundary Conditions, (D) Optional Modification for Unequally Spaced Points, and (E) Numerical Examples for the Boundary Conditions.

As stated above, Alpert et al. disclosed that the evolution scheme for the wave Equation (1) could be viewed as an integral form of the widely used Lax-Wendroff method. This method uses central differencing in time to generate the following series, $$\psi(x, t) - 2\psi(x, 0) + \psi(x, -t) = \quad (18)$$
$$t^2 \frac{\partial^2 \psi(x, 0)}{\partial t^2} + \frac{t^4}{12} \frac{\partial^4 \psi(x, 0)}{\partial t^4} + \frac{t^6}{360} \frac{\partial^6 \psi(x, 0)}{\partial t^6} + \ldots$$

Equation (18) describes the field $\psi$ at the same spatial location x, but at different time values t=−t, t=0, and t=t. As such, the right side of Equation (18) is a simple application of the well-known Taylor's theorem, which states that a function (the wave function at the left side of Equation (18)) may be written in terms of a power series (the right side of Equation (18)), and the coefficients of the power series are given by the derivative of the functions (e.g., the wave function $\psi$) at certain points. The particular combination at the left side of Equation (18) eliminates the first term and all the odd terms of the series, resulting in the right side of Equation (18).

Alpert et al. further used the wave Equation (1) that relates time derivatives to space derivatives to further modify Equation (18). That is, the wave Equation (1) may be re-written as follows, $$\nabla^2 \psi(\vec{x}, t) = \frac{\partial^2}{\partial t^2} \psi(\vec{x}, t), \quad (19)$$

which equates the space derivatives $$\nabla^2 = \frac{\partial^2}{\partial x^2} + \frac{\partial^2}{\partial y^2} + \frac{\partial^2}{\partial z^2},$$

denoting the well-known Laplace operator for the space dimensions at the left side of Equation (19), to the time derivatives $$\frac{\partial^2}{\partial t^2},$$

at the right side of Equation (19) (the equations use units in which the speed of wave propagation is dimensionless unity). Hence, using this relationship between space and time, the time derivatives of Equation (18) may be replaced by the space derivatives $\nabla^2$ to obtain the following, $$\psi(x, t) - 2\psi(x, 0) + \psi(x, -t) = \quad (20)$$
$$t^2 \nabla^2 \psi(x, 0) + \frac{t^4}{12} \nabla^4 \psi(x, 0) + \frac{t^6}{360} \nabla^6 \psi(x, 0) + \ldots$$

Expanding $\nabla^2$ in one dimension x, Equation (20) may be written as follows:

$$\psi(x, t) - 2\psi(x, 0) + \psi(x, -t) = \quad (21)$$
$$t^2 \frac{\partial^2 \psi(x, 0)}{\partial x^2} + \frac{t^4}{12} \frac{\partial^4 \psi(x, 0)}{\partial x^4} + \frac{t^6}{360} \frac{\partial^6 \psi(x, 0)}{\partial x^6} + \ldots,$$

which is the exact representation of a wave field. Therefore, Alpert et al. proposed two operations for exact representation of a wave by first providing a time derivative of the wave at a spatial location x, and second using the relationship between the space and time established by the wave Equation (1) to replace the time derivatives by space derivatives.

As further taught by Alpert et al., once a numerical approximation is selected for the Laplacian operator, the Lax-Wendroff scheme achieves arbitrary-order accuracy in time by incorporating higher and higher powers of the Laplacian in a three time level scheme provided by the left side of Equations (18), (20), and (21), which is represented by $\psi(x,t)-2\psi(x,0)+\psi(x,-t)$. It is important to note that the order of time is t=−t, then t=0, and finally t=t. Therefore, the right hand side of Equation (20) depends only on the field at a certain time (e.g., t=0).

It should be noted that the Equation (20) is the expanded version of the identity Equation (13) and (14), repeated below, from which the well-known Lax-Wendroff method depends.

$$\frac{1}{2}[\psi(\vec{x}, \Delta t) + \psi(\vec{x}, -\Delta t)] = L_{\Delta t} \psi(\vec{x}, 0) \equiv \cosh\sqrt{(\Delta t)^{2m}\nabla^2} \, \psi(\vec{x}, 0) \quad (13)$$

$$= \sum_{m=0}^{\infty} \frac{(\Delta t)^{2m} \nabla^{2m}}{(2m!)} \psi(\vec{x}, 0). \quad (14)$$

The right side of Equation (20) is the power series expansion of hyperbolic cosine for some value z, where $z=\sqrt{(\Delta t)^2 \nabla^2}$, or $z^2=(\Delta t)^2 \nabla^2$. The power series for $\cosh(z)$ is well known, and is published in many basic mathematical books. The only difference between power series of Equation (14) and that of its expanded version, which is Equation (20), is in the first term (m=0) of Equation (14). Multiplying Equations (13) and (14) by 2, and moving the only term $\psi(\vec{x},0)$ at m=0 in Equation (14) to the left side of the Equation (13) results in the following Equation (22):

$$\psi(\vec{x},\Delta t)=2L_{\Delta t}\psi(\vec{x},0)+\psi(\vec{x},\Delta t), \quad (22)$$

which is identical to the left side of Equation (18), (20), and (21).

Using the well-known Lax-Wendroff method, which is based on the identity Equation (13), the present invention uses an exact relation that relates the fields at multiple times, but discretizes the propagation operator $L_{\Delta t}$ that appears at each discrete time rather than an integral representation thereof. Note that $L_{\Delta t}$ is the operator defined by Equation (13) that acts on the operand $\psi(\vec{x},0)$. That is, $$L_{\Delta t}\psi(\vec{x}, 0) = \sum_{m=0}^{\infty} \frac{(\Delta t)^{2m}\nabla^{2m}}{(2m!)}\psi(\vec{x}, 0). \qquad (23)$$

Therefore, the present invention provides a prescription for an explicit discretization of the left-side of Equation (13) in multi-space dimensions for bulk propagation (away from boundaries), for propagation near boundaries, and a projection operator to enforce boundary conditions.

(A) Field Propagation in Bulk (Including Stability)

This section will describe in detail (i) high-order discretization of the field in the bulk, (ii) stability analysis for the discretized solution of the field in the bulk, and (iii) numerical examples for (i) and (ii).

(i) High-Order Discretization of the Field in Bulk

The bulk propagation may be defined as a field $\psi(\vec{x},\Delta t)$ propagating in a homogeneous regular lattice without boundaries. As was stated above, the wave function is a field that varies continuously in space and time, which means it has a value at every point in space and time. Therefore, it would be impossible to store and process all the wave values at every point in space and at every time because there would be an infinite number of values. Accordingly, an approximate representation is needed for the computation of the field, which is done by Equation (23), which is the discretized representation of the wave field. In general, the field $\psi(\vec{x},\Delta t)$ is discretized by tabulating its values on the space-time lattice as follows:

$$\psi_{mn}(x, t) \approx \psi(m\Delta x, n\Delta t), \qquad (24)$$

where $\psi_{mn}$ is the discretized wave field, the temporal steps are indexed by some integer n and related to the continuous time by the relation t=nΔt, and spatial steps are indexed by another integer m and related to continuous space (e.g., in the x direction) by the relation x=mΔx. Therefore, n is the number of time steps that have elapsed from the beginning of computation, Δt is the temporal discretization interval (i.e., time step size), m is the grid coordinate number representing a specific point in the one-dimensional space, and Δx is the spatial discretization interval (i.e., space increment or cell size).

From Equation (24), the present invention constructs a high-order discretization of the propagation operator $L_{\Delta t}$, defined by Equation (13). This is accomplished by first requiring the discretization of the propagation operator $L_{\Delta t}$ to be exact for a suitable set of functions (e.g., Equation (25)), namely polynomials up to some degree d, $$(L_{\Delta t}x^k)(0) = \begin{cases} (\Delta t)^k & k \text{ even} \\ 0 & k \text{ odd} \end{cases}. \qquad (25)$$

One may think of a suitable set of functions as "sample" or "test" functions that are selected to provide an exact discretization value of the propagation operator $L_{\Delta t}$ acting on the test functions, which can then be used to determine the quality of discretization values for other functions. The exactness of the discretization obtained from the suitable set of functions will therefore facilitate in a good approximation of other functions. That is, the exact discretization values from the set of suitable functions can be used to determine the quality of approximation of other functions by comparison of the values of discretization obtained from other functions to the values of discretization obtained from the suitable set of functions. Equation (25) may be tested for exactness by applying the propagation operator $L_{\Delta t}$ to the selected function operand $x^k$, and then differentiating the propagation operator $L_{\Delta t}$ with respect to its operand; in other words, determining the limit of the propagation operator $L_{\Delta t}$ as its operand function $x^k$ approaches zero, i.e., the $$\lim_{x \to 0}(L_{\Delta t}(x^k)).$$

Recall from Equation (23) that the propagation operator $L_{\Delta t}$ is represented by Equation (13). Therefore, the Equation (25) may be re-written with the limit operator as follows, $$L_{\Delta t}x^k = \lim_{x \to 0}\sum_{m=0}^{d}\frac{(\Delta t)^{2m}\left(\frac{\partial}{\partial x}\right)^{2m}}{2m!}x^k = (\Delta t)^k \text{ for } k \text{ even.} \qquad (26)$$

Continuously differentiating $x^k$ will result in $x^0$ and then zero. However, as the limit of x approaches zero, the only $x^k$ term that will remain is $x^0$. This results because $x^k$ is differentiated k times to result in $x^0$, which is equal to 1, which will remain due to the limiting process. In addition, when the $x^k$ is differentiated k times, the result is k! multiplied by $x^0$, or k!($x^0$). This means that the only remaining term 2m will equal to k, or 2m=k, which forces $(\Delta t)^k$ terms that do remain to be the ones where k is even. Hence, Equation (25) is a mathematical statement of conditions, whose values representing the propagation operator $L_{\Delta t}$ acting on the set of suitable functions are exact.

The discretization of the propagation operator $L_{\Delta t}$ is set to be 2M+1 numbers, which are odd values of numbers to provide a symmetry with respect to any selected point m. The 2M+1 numbers are represented by the following equation:

$$\hat{L}_m(\Delta t/\Delta x), \qquad (27)$$

where $\hat{L}_m$ is the discretized propagation operator that operates on the discretized representation of the wave function (Equation (24)), with Δt being the temporal discretization interval (i.e., time step size), and Δx being the spatial discretization interval (i.e., space increment or cell size). The reason for the ratio (Δt/Δx) in Equation (27) is described below. Please note that the discretized propagation operator $\hat{L}_m$ should be written as $\hat{L}_{m(\Delta t)}$, but the subscript Δt is dropped for clarity and ease of reading. Placing Equation (27) within the context of Equations (13) and (14) results in the discretization of the propagation operator $L_{\Delta t}$ in Equation (13) (which as stated above, is a set of 2M+1 numbers represented by Equation (27)) with the result that:

$$(L_{\Delta t}\psi)(x) \approx \sum_{m=-M}^{M}\hat{L}_m(\Delta t/\Delta x)\psi(x + m\Delta x). \qquad (28)$$

In Equation (28) the discretized propagation operator, $\hat{L}_m(\Delta t/\Delta x)$, operates on the discretized field $\psi(x+m\Delta x)$, resulting in an approximate discretized representation of the wave field $\psi(x)$. The discretized propagation operator $\hat{L}_m$ in one dimension may be written in the form of Equations (22) and (23), as $$[\nabla^2][\psi_m] = [1/(\Delta x)^2][\psi_{m+1} - 2\psi_m + \psi_{m-1}]. \tag{29}$$

Multiplying both sides of the Equation (29) by $(\Delta t)^2$ will result in the following equation $$[(\Delta t)^2 \nabla^2][\psi_m] = [(\Delta t)^2/(\Delta x)^2][\psi_{m+1} - 2\psi_m + \psi_{m-1}], \tag{30}$$

and hence the reason for the ratio $(\Delta t/\Delta x)$ for the discretized propagation operator $\hat{L}_m$ in Equations (27) and (28). It should be noted that Equation (28) requires that $$\sum_{m=-M}^{M} \hat{L}_m(\tau) m^j = \beta_j \equiv \begin{cases} \tau^j & j \text{ even} \\ 0 & j \text{ odd} \end{cases}; \tag{31}$$

$$0 \leq j \leq d,$$

where $\tau = (\Delta t/\Delta x)$, m is the index of summation, and j in Equation (31) is equivalent to the power value represented by the symbol k in Equation (25). Recall that Equation (25) was one of the suitable "test" functions, namely polynomials up to some degree d. Equation (31) is now in the form with discretization that is exact because it is patterned in accordance with the suitable set of functions, namely the polynomials up to some degree d. Equation (25) describes the true propagation operator $L_{\Delta t}$ acting on certain continuous functions, Equation (28) is the discretized version of the propagation operator $L_{\Delta t}$ acting on the field, and Equation (31) enforces the conditions that the discretized versions of the $L_{\Delta t}$, which is represented by the numbers $\hat{L}_m(\equiv t/\Delta x)$ in Equation (28) obey the pattern of Equation (25) for an exact discretization. Hence, Equation (31) is patterned in the form of Equation (25), which is a set of suitable functions, namely polynomials up to some degree d.

It should be noted that there are 2M+1 unknown numbers (i.e., $\hat{L}_m(\Delta t/\Delta x)$) and d+1 equations (according to Equation (31)). This implies that an equal number of equations and unknown numbers exist if 2M+1=d+1, or 2M=d, which represents a square system of equations. However, in most cases, one could (and usually should) allow M>(d/2) to achieve stability.

(ii) Stability Analysis

The stability of the time-evolution is considered next before providing a detailed discussion regarding undetermined systems, which are systems that have more unknowns than equations. As was stated above, the numerical stability of a method describes how that method responds to the differences between the calculation and the function being approximated. In a stable method, the errors due to the approximations are damped out as the computation proceeds. In an unstable method, any errors in processing become magnified as the calculation proceeds. Because the (discretized) propagation is invariant to translations in both space and time, the present invention uses the well-known Von Neumann stability criteria to determine stability. In mathematical terms, solutions for the well-known equation, $$\psi_{mn} = e^{i(\kappa m + \omega n)}, \tag{32}$$

must be determined to find the "dispersion relation:"

$$e^{i\omega} = \hat{\alpha}(\kappa, \tau) \pm \sqrt{\hat{\alpha}^2(\kappa, \tau) - \hat{\alpha}(\kappa, o)}, \tag{33}$$

where $$\tau \equiv \frac{\Delta t}{\Delta x}, \tag{34}$$

and $$\hat{\alpha}(\kappa, \tau) \equiv \hat{L}_0(\tau) + 2\sum_{m=1}^{M} \hat{L}_m(\tau)\cos(km). \tag{35}$$

Equation (32) is a well-known basis for the introduce-able representation of a translation group. Dispersion relation defines the relationship between the $\kappa$, which represents changes in space, and $\omega$, which represents changes in time. Propagation is stable only if both $$|\hat{\alpha}(\kappa,\tau) \pm \sqrt{\hat{\alpha}^2(\kappa,\tau) - \hat{\alpha}(\kappa,o)}| \leq 1. \tag{36}$$

The stability condition motivates the approach described by the present invention to solve undetermined equations for $\hat{L}_m(\tau)$. The $\hat{L}_m(\tau)$ are the coefficients of a Fourier series for $\hat{\alpha}(\kappa,\tau)$. The requirement that the discretization be high-order (exact for polynomials up to degree d) means that the first d+1 derivatives (including the zeroth) of the $\partial^j\hat{\alpha}(\kappa,\tau)/\partial\kappa^j$ at $\kappa=0$ match those of the "true" $\alpha$:

$$\alpha(\kappa,\tau) \equiv \cos(\kappa\tau). \tag{37}$$

Trying to force too many derivatives of $\hat{\alpha}$ to be correct at $\kappa=0$ will cause the stability condition Equation (36) to be violated at larger K. What is needed then is to have $\hat{\alpha}(\kappa,\tau)$ be a good approximation for small $\kappa$ and generally small for $\kappa$ large enough that it is not a good approximation. Therefore, the following minimization is done subject to the high-order constraints of Equation (31):

$$\frac{1}{2\pi}\int_{-\pi}^{\pi} d\kappa \hat{\alpha}^2(\kappa, \tau) = \hat{L}_0^2(\tau) + 2\sum_{m=1}^{M} \hat{L}_m^2(\tau), \tag{38}$$

which will allow an easy method to best try to fit the upper limit of Equation (36). The minimization of Equation (38) subject to the constraints of Equation (31) is an elementary exercise in Lagrange multipliers. The solution is:

$$\hat{L}_m = \sum_{j=0}^{d} \hat{\lambda}_j m^j, \tag{39}$$

where the LaGrange multipliers $\hat{\lambda}_j$, satisfy the linear equations $$\hat{\lambda}_0 + 2\sum_{m=1}^{M}\sum_{j=0}^{d} m^{j'} \hat{\lambda}_{j'} = \beta_0, \tag{40}$$

$$2\sum_{m=1}^{M}\sum_{j=0}^{d} m^{j+j'} \hat{\lambda}_j = \beta_j, \tag{41}$$

where $\beta_j$ are defined in Equation (31). In general, the same size stencils for $\hat{L}(\tau)$ and $\hat{L}(0)$ are always used.

(iii) Numerical Examples for (i) and (ii)

This section provides some numerical examples of the discretization and stability for the bulk propagation using the methods of present invention. The numerical examples will provide examples of the stencil radii M required for a given discretization ratio $\tau=\Delta t/\Delta x$ and degree d, and will show measures of discretization error. However, before the examples, a special aspect of the 1+1 dimensional wave equation should be reviewed. In one space dimension, the propagation operator $L_{\Delta t}$ is as follows:

$$L_{\Delta t}\psi(x, 0) = \cosh\left(\Delta t \frac{\partial}{\partial x}\right)\psi(x, 0) \quad (42)$$
$$= \frac{1}{2}[\psi((x + \Delta t, 0) + \psi(x - \Delta t, 0)].$$

Therefore, if an integral value $\tau$ is selected, the discrete representation of the propagation operator $\hat{L}$ can be determined. In other words, any solution of the wave equation will obey the following:

$$\psi(x,t+\Delta t)+\psi(x,t-\Delta t)=\psi(x+\Delta t,t)+\psi(x-\Delta t,t). \quad (43)$$

For non-integer $\tau$ however, the discrete representation of propagation operator $\hat{L}$ will be the sum of two high-order interpolators, because the point $x+\Delta t$ will lie between lattice points (as mentioned above, the equations use units in which the speed of wave propagation is dimensionless unity). The examples provided herein use non-integer $\tau$ to avoid the complete absence of discretization error. In higher dimensions, of course, the discretization of the propagation operator $L_{\Delta t}$ is not so easily determined for any $\tau$. With non-integer $\tau$, the one-dimensional examples behave very much like those with any $\tau$ in higher dimensions.

The discretization of the field is done by first constructing a high-order discretization of the propagation operator $L_{\Delta t}$, defined in Equation (13). As stated above, the present invention requires that the discretization to be exact for a suitable set of functions, namely polynomials up to some degree d. Therefore, the first act is to select the desired degree d of the polynomial. The next act in the discretization process is to select the lattice ratio $\tau=\Delta t/\Delta x$, i.e., the time steps versus the space steps. The third act is to find the minimum discretization radius M such that the stability conditions with respect to Equation (36) are satisfied; that is, $M \geq d/2$.

Table 1 lists the minimum stencil radii M for $\tau=\frac{1}{2}$, $\frac{3}{2}$, and $2 \leq d \leq 8$. The size of the stencil is 2M+1. The actual equations used to obtain the minimum stencil radii M are Equation (39) to (41), which first calculate the discretized propagation operator $\hat{L}_m$. The results so obtained from Equations (39) to (41) are then used within Equation (35) and (36) to eventually determine the propagation stability. Of course, if the result violates the conditions of Equation (36), a larger value of M must then be selected. For $\tau=\frac{1}{2}$, the stencil are of minimum size to achieve the discretization order. For $\tau=\frac{3}{2}$ and d=2, the stencil is of minimum size to cover the past light cone. In these cases the system of Equation (31) is square, and a particular exemplary solution to the wave equation is $\hat{L}_0$, which is the identity matrix, which is to say that there is no filtering of the field at the earliest (t–$\Delta$t) time step. For higher order, the minimum stencil size grows not much faster than for $\tau=\frac{1}{2}$.

TABLE 1

Minimum stencil radii, M needed for stability

| D | $\tau = \frac{1}{2}$ | $\tau = \frac{3}{2}$ |
|---|---|---|
| 2 | 1 | 2 |
| 4 | 2 | 4 |
| 6 | 3 | 5 |
| 8 | 4 | 6 |

The convergence of the discretization is examined by computing the deviation from the exemplary exact solution, $$\psi(x, t) = \cos 2\pi(x-t). \quad (44)$$

Tabulations of the integral of the square of the error as a function of the number N of discretization points used are given for various orders of the discretization, $\tau=\frac{1}{2}$, $\frac{3}{2}$ in Tables 2 and 3. All calculations were done in machine precision (64 bit reals). Numbers smaller than $10^{-16}$ appear because of the squaring of the error. The domain of propagation is $0 \leq x \leq 1$ and N time steps are used, so that the solution is computed up to $t=\tau$. Recall that discretizations approximate exact functions, and therefore will have an approximation error. In addition, if more points N are used in the discretization to represent a continuous function, the approximation error should decrease. The following simply determines, as the number of points N is increased, how quickly the error reduces. Therefore, the convergence values given in the tables are p, determined by the fit of $cN^{-P}$ in the integrated square error $$\varepsilon_N^2 = cN^{-p}$$

for the range of N. All discretizations were verified to be stable by running for thousands of time steps from white nose initial conditions and monitoring $\int \psi(x,t)^2 dx$. Besides showing the expected high-order convergence, these tables show the value of high-order discretization. For both values of $\tau$, the N=8, d=8 results are better than those for N=40, d=2.

TABLE 2

Integral square error at $t = \tau = \frac{1}{2}$ (N steps) for equally spaced, periodic boundary conditions.

| N | d = 2 | d = 4 | d = 6 | d = 8 |
|---|---|---|---|---|
| 8 | $1.9 \times 10^{-3}$ | $1.0 \times 10^{-5}$ | $8.8 \times 10^{-8}$ | $9.4 \times 10^{-10}$ |
| 16 | $1.2 \times 10^{-4}$ | $4.2 \times 10^{-8}$ | $2.4 \times 10^{-11}$ | $1.7 \times 10^{-14}$ |
| 24 | $2.3 \times 10^{-5}$ | $1.6 \times 10^{-9}$ | $1.9 \times 10^{-13}$ | $2.7 \times 10^{-17}$ |
| 32 | $7.2 \times 10^{-6}$ | $1.7 \times 10^{-10}$ | $6.0 \times 10^{-15}$ | $2.7 \times 10^{-19}$ |
| 40 | $2.9 \times 10^{-6}$ | $2.8 \times 10^{-11}$ | $4.1 \times 10^{-16}$ | $7.7 \times 10^{-21}$ |
| Convergence | 4.0 | 8.0 | 11.9 | 15.9 |

TABLE 3

Integral square error at $t = \tau = \frac{3}{2}$ (N steps) for equally spaced, periodic boundary conditions.

| N | d = 2 | d = 4 | d = 6 | d = 8 |
|---|---|---|---|---|
| 8 | $8.1 \times 10^{-2}$ | $3.1 \times 10^{-2}$ | $1.4 \times 10^{-3}$ | $4.8 \times 10^{-5}$ |
| 16 | $5.4 \times 10^{-3}$ | $1.8 \times 10^{-4}$ | $5.1 \times 10^{-7}$ | $1.2 \times 10^{-9}$ |
| 24 | $1.1 \times 10^{-3}$ | $7.4 \times 10^{-6}$ | $4.2 \times 10^{-9}$ | $2.0 \times 10^{-12}$ |
| 32 | $3.4 \times 10^{-4}$ | $7.6 \times 10^{-7}$ | $1.4 \times 10^{-10}$ | $2.1 \times 10^{-14}$ |

TABLE 3-continued

Integral square error at $t = \tau = \frac{1}{2}$ (N steps) for equally spaced, periodic boundary conditions.

| N | d = 2 | d = 4 | d = 6 | d = 8 |
|---|---|---|---|---|
| 40 | $1.4 \times 10^{-4}$ | $1.3 \times 10^{-7}$ | $9.6 \times 10^{-12}$ | $5.8 \times 10^{-16}$ |
| Convergence | 4.0 | 8.0 | 11.7 | 15.6 |

(B) Field Propagation Near Boundaries

The propagation formula Equation (13) is valid anywhere in the propagation region; however, if one tried to apply the "bulk" discretization near the boundaries, one would have to evaluate the field outside of the propagation region (the other side of the boundary). It seems as if the proper definition of the propagation operator $L_{\Delta t}$ for field points less than $\Delta t$ from the boundary might depend on the boundary conditions. Nevertheless, the present invention discretizes the propagation operator $L_{\Delta t}$ without regard to any boundary conditions, using (again) the formula for monomials, Equation (25). Near boundaries, one might also select to have an irregular mesh. The present invention calls the points for which it uses an "individually computed" discretization of the propagation operator $L_{\Delta t}$ "border points." For each of these points, $$(L_{\Delta t}\psi)(y) \approx \sum_{neighbors, x} \hat{L}(y, x)\psi(x). \quad (45)$$

With Equation (45), the output of the propagation operator $L_{\Delta t}$ acting on a tabulation point y is evaluated at some neighborhood points x. The difference between Equation (45), which is used to calculate the propagation operator near boundaries, and Equation (28), which is repeated below, and which is used to calculate propagation at the bulk, is the lack of symmetry in Equation (45) with respect to the selected nearby neighborhood points x in relation to the actual targeted border point y. Unlike the bulk region, due to the boundary, the targeted border points y could have their symmetrical neighborhood points x outside the boundary, which obviously cannot be used. Therefore, the symmetry that exists with respect to the bulk, represented by the values −M and M in Equation (28) is replaced by a neighborhood of x in Equation (45).

$$(L_{\Delta t}\psi)(x) \approx \sum_{m=-M}^{M} \hat{L}_m(\Delta t/\Delta x)\psi(x + m\Delta x) \quad (28)$$

The other difference between bulk and boundary calculations is that due to the boundary (which may or may not be a straight line) the targeted border point y for which the propagation operator is being calculated, could have its neighborhood points x at unequal spacing. In other words, due to the shape of the boundary, the neighborhood points x might have closer spacing between them then another two neighbor x's. Therefore, near boundaries, the selected points representing a field are not necessarily equally spaced, as is assumed in Equation (28). Therefore, the neighbor points x do not have to be equally spaced and, further, do not have to be placed symmetrically around the target point y. Other calculations for the propagation near boundaries are similar to the calculations in the bulk.

In general, the size of the discretization (the number of points x for which the discretized propagation operator for the border points $\hat{L}(y,x)$ is nonzero) need not be equal to that in the bulk (2M+1), or even to that for other border points y. Nevertheless, the present invention has found that one can achieve stability by using the same number of neighboring points in the border as in the bulk, for both completely regular meshes and those with points spaced more closely near the boundaries.

(C) Enforcement of Boundary Conditions

As stated above, an essential feature of the present invention is independent discretization of the propagation operator $L_{\Delta t}$ and the boundary conditions (BCs). The present invention enforces the BCs by applying a projection operator after each use of the stepping formula Equation (16). The BCs are expressed as linear constraints, $$\sum_j b_{ij}\psi(x_j) = c_i, \quad (46)$$

where $\psi(x_j)$ represents a tabulation of a field (any field) at some points that are represented by $x_j$, j label points in the propagation region (generally, near boundary), i label points on the boundary, and by express the BCs. The present invention provides exemplary numerical results for both homogeneous BCs ($c_i=0$) and inhomogeneous BCs. Results are substantially similar. The BCs are enforced by applying the projection operation, $$\psi_j \leftarrow \overline{\psi} \equiv \psi_j + \sum_i \gamma_i b_{ij}, \quad (47)$$

where $\overline{\psi}$ is the same field $\psi_j$, but projected onto the boundary condition compliance subspace, i.e., $\overline{\psi}$ is the same field $\psi_j$ that also obeys the BCs due to the application of the projection operator. The projection operator $$\psi_j + \sum_i \gamma_i b_{ij}$$

filters the portions of the field $\psi_j$ that do not obey the BCs. The coefficients $\gamma_i$ are determined by solution of the linear equations:

$$\sum_i \left(\sum_j b_{ij} b_{i'j}\right)\gamma_i = c_i - \sum_j b_{ij}\psi_j. \quad (48)$$

In practice, one does a decomposition (e.g., Lower-Upper triangle matrices (LU)) of the coefficient matrix $\Sigma_j b_{ij} b_{i'j}$ as a pre-computation so that the equations can be solved efficiently at each time-step.

It should be noted that a homogeneous boundary condition is one where the propagation operator on the field is equal to zero, or $c_i=0$. Therefore, zero fields always obey homogeneous BCs. The differences between projection operator in Equation (17) and that of Equation (47) are cosmetic in nature. That is, Equation (17) states that there is some projection operator $P_b$ that operates on the field t, whereas Equation (47) explicitly defines the projection operator $P_b$ of Equation (17) in terms of $b_{ij}$, which express the BCs.

The computations of the boundary condition coefficients are done exactly as for the propagation operator. That is, $$\sum_j b_{ij}^2 \tag{49}$$

is minimized subject to the constraints that $$\left. \frac{d^l}{dx^l}(x-x_i)^k \right|_{x \to x_i} = \sum b_{ij}(x-x_i)^k \tag{50}$$

for all required values of l and k, where l is the number of derivative, and k is the degree of the monomial for which the boundary condition discretization is to be exact. Recall that the discretization of an operator may be computed by requiring the operator to give exactly the right results on a suitable class of functions. Equation (50) is similar in that it is a constraint on the expression of the BCs, $b_{ij}$. Examples of commonly used boundary conditions such as Dirichlet and Neumann follow.

(i) Dirichlet Boundary Conditions

The Dirichlet boundary condition states that the field vanishes at the boundary. If there is a field discretization point $x_i$ exactly on the boundary, the homogeneous Dirichlet BC is simply $\psi_i = 0$, and the part of the projection operation corresponding to that BC would seem to be simply set that field value to zero. If field discretization point $x_i$ were not on the boundary, then $b_{ij}$ would be the coefficients of a high-order extrapolation operator from the field points $x_j$ to the boundary points $x_i$. In order for the numerical evolution to be locally exact, for polynomials up to degree d, the following must be enforced for a homogeneous boundary condition solution:

$$\psi(x_i) = 0,$$

and $$\frac{\partial^l}{\partial t^l} \psi(x_i, t) = 0; \tag{51}$$

$$l = 0, \ldots, d.$$

In other words, the field $\psi(x_i)$ is set to equal zero (due to homogenous boundary conditions), and since $\psi(x_i) = 0$ must be true for all times, then the field $\psi(x_i, t)$ time derivatives must also be set to equal zero. With the formulation presented, the odd time derivatives are implicitly enforced by the application of the BC projection operator at previous two time-steps. For even time derivative l, the present invention uses $$\frac{\partial^l}{\partial t^l} \psi(x_i, t) = \frac{\partial^l}{\partial x^l} \psi(x_i, t). \tag{52}$$

In other words, using the relationship between the space and time established by the wave Equation (1), the time derivatives of Equation (51) are replaced by space derivatives.

For nonzero l, the coefficients of the discretized boundary condition $b_{ij}$ are thus (usually extrapolative) high-order discretization, as follows:

$$\frac{\partial^l}{\partial x^l} \psi. \tag{53}$$

Equation (53) represents differentiated extrapolation, which determines the derivatives of the field at certain number of known points. Equation (53) is simply the rate of change of values represented by Equation (52).

In all cases, the present invention uses the same discretization criteria as before—the coefficients are determined by the requirement that the discretization be exact for polynomial $\psi$ up to some degree d. The BCs for higher derivatives of the field should not be regarded as "additional" or "extra." After all, to obtain an error that is proportional to a high power of $\Delta t$, one must make sure that the boundary condition is obeyed to that order.

(ii) Neumann Boundary Condition

Neumann boundary condition for one dimension states that the derivative of the field vanishes at the boundary. For more than one dimension, it is the derivative of the normal (perpendicular) component of the field that vanishes at the boundary. Neumann BCs are handled analogously, i.e., the coefficient $b_{ij}$ being the extrapolative high-order discretization of:

$$\frac{\partial^l}{\partial t^l} \psi(x_i, t) = 0, \tag{54}$$

for odd l.

(D) Optional Modification for Unequally Spaced Points

The discretization criteria used for discretization of both the propagation operators and the BCs can be summarized as minimization of:

$$\sum_j A_j^2, \tag{55}$$

subject to the linear constraints, $$\sum_j A_j f_k(x_j) = r_k, \tag{56}$$

where $\{A_j\}$ is the discretization of some linear operator that provides the result $r_k$ when acting on a function $f(x)$:

$$\int dx A(x) f_k(x) = r_k. \tag{57}$$

Equations (55) through (57) are a generalization of the mechanism for finding discretizations for both the propagation operator and the boundary condition. The quantity A or $A_j$ could represent the propagation operator or the BCs. The $A(x)$ is the exact, continuous function, and $A_j$ are approximation numbers or a discretized representation of $A(x)$. The $f_k(x)$ may represent any function, and its index k is the index on the function for which the discretization is exact.

It should be noted that the quantity being minimized corresponds to a trapezoidal-rule approximation to the integral of $A^2(x)$. Therefore, it would seem natural, in the case of unequally spaced points, to generalize the criteria to minimized the weighted sum of squares using the trapezoidal-rule approximation:

$$\sum_j w_j A_j^2, \tag{58}$$

where $\{w_j\}$ are the weights for a quadrature rule having abscissae at the points $x_j$. The solution then becomes:

$$A_j = \frac{1}{w_j} \sum \lambda_k f_k(x_j), \tag{59}$$

where the $\lambda_k$ solve $$\sum_k \left[ \sum \frac{1}{w_j} f_k(x_j) f_k(x_j) \right] \lambda_k = r_k. \tag{60}$$

Since the result will usually depend relatively weakly on the quadrature weights $w_j$, it does not seem necessary that a highly accurate rule be used, unless, of course, one actually needs to approximate an integral. In the examples presented in the following section, quadrature weights are used as described in the case of unequally spaced points. The answers were found to be somewhat better than using $w_j=1$, although both were stable and had the expected rate of convergence.

(E) Numerical Examples for Boundary Conditions

The following exhibit convergence results for both (i) homogeneous and (ii) inhomogeneous BCs.

(i) Homogeneous Boundary Conditions

Recall that the wave equation was solved with mixed homogeneous BCs: Dirichlet at one end (x=0) and Neumann at the other (x=1). In addition, the error was computed by deviation from the exact solution:

$$\psi(x, t) = \sin\frac{3\pi}{2} x \cos\frac{3\pi}{2} t. \tag{61}$$

Equation (61) is another exemplary representation of the wave Equation (1) that also obeys boundary conditions with respect to Dirichlet BCs at one end (x=0) and Neumann BCs at the other (x=1). Solutions were computed with various orders of discretization with $\tau=\frac{1}{2}, \frac{3}{2}$. The present invention shows results for both equally spaced points and for meshes that are tapered near the boundaries. The order of convergence is exhibited by the dependence of the integrated square error on the number N of discretization points used. The convergence values given in the tables is p, determined by the fit of the integrated square error $\epsilon_N^2=cN^{-p}$. All discretizations were verified to be stable by running for thousands of time steps from the white nose initial conditions and monitoring $\int \psi(x,t)^2 dx$. In all the numerical examples, the radius of the stencil, M, is determined solely by the degree of the method. Even when points are not equally spaced, the values of M are given by Table 1.

For equally spaced points, the results for $\tau=\frac{1}{2}$ are shown in Table 4, and the results for $\tau=\frac{3}{2}$ are shown in Table 5. These examples were run from t=0 to 1, so that the number of time steps were N/τ. Both sets of data demonstrate good convergence, $p \geq 2d$. The superior efficiency of high-order discretization is again apparent, in both cases the coarsest discretization with d=8 are more accurate than the finest discretization with d=2 (see Table 6).

TABLE 4

Integral square error after N/τ steps for equally spaced points, $\tau = \frac{1}{2}$

| N | d = 2 | d = 4 | d = 6 | d = 8 |
|---|---|---|---|---|
| 12 | $2.4 \times 10^{-4}$ | $9.9 \times 10^{-6}$ | $2.1 \times 10^{-7}$ | $6.2 \times 10^{-9}$ |
| 24 | $1.6 \times 10^{-5}$ | $3.2 \times 10^{-9}$ | $1.1 \times 10^{-11}$ | $2.7 \times 10^{-14}$ |
| 36 | $3.2 \times 10^{-6}$ | $4.1 \times 10^{-11}$ | $1.9 \times 10^{-14}$ | $1.3 \times 10^{-17}$ |
| 48 | $1.0 \times 10^{-6}$ | $2.1 \times 10^{-12}$ | $2.6 \times 10^{-16}$ | $5.3 \times 10^{-20}$ |
| 60 | $4.2 \times 10^{-7}$ | $2.7 \times 10^{-13}$ | $9.0 \times 10^{-18}$ | $6.7 \times 10^{-22}$ |
| 72 | $2.0 \times 10^{-7}$ | $5.8 \times 10^{-14}$ | $5.0 \times 10^{-19}$ | $2.2 \times 10^{-23}$ |
| 84 | $1.1 \times 10^{-7}$ | $1.6 \times 10^{-14}$ | $4.2 \times 10^{-20}$ | $1.2 \times 10^{-24}$ |
| Convergence | 4.0 | 10.4 | 15.0 | 18.7 |

TABLE 5

Integral square error after N/τ steps for equally spaced points, $\tau = \frac{3}{2}$

| N | d = 2 | d = 4 | d = 6 | d = 8 |
|---|---|---|---|---|
| 18 | $1.4 \times 10^{-3}$ | $1.8 \times 10^{-4}$ | $1.8 \times 10^{-6}$ | $1.3 \times 10^{-8}$ |
| 36 | $2.6 \times 10^{-5}$ | $5.7 \times 10^{-8}$ | $8.5 \times 10^{-11}$ | $4.5 \times 10^{-14}$ |
| 54 | $4.3 \times 10^{-6}$ | $7.3 \times 10^{-10}$ | $2.1 \times 10^{-13}$ | $1.9 \times 10^{-17}$ |
| 72 | $1.3 \times 10^{-6}$ | $4.9 \times 10^{-11}$ | $3.2 \times 10^{-15}$ | $8.3 \times 10^{-20}$ |
| 90 | $5.0 \times 10^{-7}$ | $7.1 \times 10^{-12}$ | $1.3 \times 10^{-16}$ | $1.3 \times 10^{-21}$ |
| 108 | $2.4 \times 10^{-7}$ | $1.5 \times 10^{-12}$ | $9.9 \times 10^{-18}$ | $4.7 \times 10^{-23}$ |
| 126 | $1.2 \times 10^{-7}$ | $4.3 \times 10^{-13}$ | $1.2 \times 10^{-18}$ | $2.8 \times 10^{-24}$ |
| Convergence | 4.7 | 10.2 | 14.5 | 18.6 |

The test for unequally-spaced points near the boundaries used abscissae derived from Gauss Legendre quadrature rules. The unequally spaced points and the associated weights are tabulated in Table 6, assuming the last equally spaced point is $x_0=0$. The equally spaced points are separated by a unit length, with unit weights. The first point in the tapered set is placed at 1. The same point spacing and weights are used on both ends (that have different BCs). As shown in Table 6, the BCs are enforced at locations tabulated in the column labeled "Endpoint." The resulting abscissae are mapped into the interval 0<x<1. This is to show that where each case runs over the same time interval (0≦t≦1), τ, the ratio Δt/Δx (in the regular part of the mesh) varies somewhat. Specifically, after selecting a nominal $\tau_0$, the number of time steps is given by $N_t=N/\tau_0$, and then $\Delta t=1/N_t$. The resulting plurality of τ approach $\tau_0$ from below as N increases. In other words, $\tau_0$ is the ratio of Δt to the average of Δx over the mesh. Tabulations of the integrated square error and the approximate convergence rate are given in Table 7 for $\tau=\frac{1}{2}$ and in Table 8 for $\tau=\frac{3}{2}$.

For the case d=8, $\tau_0=\frac{3}{2}$, N=18, the ratio of Δt to minimum point spacing is ~7.58. The degree to which this apparently violates the Courant-Friedrichs-Lewy (CFL) constraint (Δt/Δx)≦1 without losing stability demonstrates its utility because it allows fine discretization near boundaries. Of course, more generally, one could regard the discretization as consistent with CFL constraint in the sense that there are always points in the stencil outside the past light cone. The use of a tapered mesh near the boundaries only results in less error for high discretization orders and fine discretization. This does not mean that tapered meshes in higher dimensions will not be useful—in one-space dimension, there is no need to resolve more detail at the boundaries.

TABLE 6

Abscissae and weights for points near boundary

| Stencil Radius M | Endpoint | Abscissae $x_j$ | Weights $w_j$ |
|---|---|---|---|
| 1 | 2.595389 | 2.453886 | 0.3589914 |
|   |          | 1.885491 | 0.755935 |
|   |          | 1.000000 | 0.9804617 |
| 2 | 3.858537 | 3.770901 | 0.2239182 |
|   |          | 3.405347 | 0.5019379 |
|   |          | 2.781822 | 0.7358097 |
|   |          | 1.955575 | 0.9043423 |
|   |          | 1.000000 | 0.9925291 |
| 3 | 5.127275 | 5.063807 | 0.1625074 |
|   |          | 4.796124 | 0.3709135 |
|   |          | 4.327688 | 0.5622999 |
|   |          | 3.680294 | 0.7274223 |
|   |          | 2.884197 | 0.8585373 |
|   |          | 1.976621 | 0.9495098 |
|   |          | 1.000000 | 0.9960851 |
| 4 | 6.397964 | 6.348216 | 0.1274905 |
|   |          | 6.137416 | 0.2932146 |
|   |          | 5.764537 | 0.4507562 |
|   |          | 5.240223 | 0.5953526 |
|   |          | 4.579545 | 0.7228262 |
|   |          | 3.801508 | 0.8295069 |
|   |          | 2.928494 | 0.9123247 |
|   |          | 1.985616 | 0.9688968 |
|   |          | 1.000000 | 0.9975957 |
| 5 | 7.669561 | 7.628656 | 0.1048763 |
|   |          | 7.454908 | 0.2421512 |
|   |          | 7.145873 | 0.3749203 |
|   |          | 6.707496 | 0.5004101 |
|   |          | 6.148301 | 0.6161636 |
|   |          | 5.479169 | 0.7199254 |
|   |          | 4.7131124 | 0.8096750 |
|   |          | 3.865075 | 0.8836655 |
|   |          | 2.951530 | 0.9404565 |
|   |          | 1.990268 | 0.9789427 |
|   |          | 1.000000 | 0.9983748 |
| 6 | 8.9411655 | 8.906923 | 0.08907104 |
|   |          | 8.759192 | 0.2061271 |
|   |          | 8.495590 | 0.3204653 |
|   |          | 8.119757 | 0.4303203 |
|   |          | 7.636963 | 0.5341377 |
|   |          | 7.053982 | 0.6304578 |
| 6 | 8.9411655 | 6.378998 | 0.7179281 |
|   |          | 5.621487 | 0.7953204 |
|   |          | 4.792081 | 0.8615482 |
|   |          | 3.902424 | 0.9156818 |
|   |          | 2.965004 | 0.9569613 |
|   |          | 1.992981 | 0.9848072 |
|   |          | 1.000000 | 0.9988285 |

TABLE 7

Integrated square error after $N/\tau_0$ time steps for tapered mesh, $\tau_0 = \frac{1}{2}$

| N | d = 2 | d = 4 | d = 6 | d = 8 |
|---|---|---|---|---|
| 18 | $4.6 \times 10^{-4}$ | $8.7 \times 10^{-5}$ | | |
| 24 | $2.2 \times 10^{-5}$ | $2.3 \times 10^{-8}$ | $8.3 \times 10^{-12}$ | $1.8 \times 10^{-14}$ |
| 36 | $4.0 \times 10^{-6}$ | $2.9 \times 10^{-10}$ | $8.2 \times 10^{-15}$ | $2.4 \times 10^{-18}$ |
| 48 | $1.2 \times 10^{-6}$ | $1.6 \times 10^{-11}$ | $6.8 \times 10^{-17}$ | $5.9 \times 10^{-21}$ |
| 60 | $4.7 \times 10^{-7}$ | $1.8 \times 10^{-12}$ | $1.7 \times 10^{-18}$ | $6.8 \times 10^{-23}$ |
| 72 | $2.2 \times 10^{-7}$ | $3.2 \times 10^{-13}$ | $8.0 \times 10^{-20}$ | $1.9 \times 10^{-24}$ |
| 84 | $1.2 \times 10^{-7}$ | $7.5 \times 10^{-14}$ | $5.9 \times 10^{-21}$ | $2.2 \times 10^{-25}$ |
| 96 | | | $6.7 \times 10^{-22}$ | $7.8 \times 10^{-27}$ |
| Convergence | 4.2 | 10.7 | 16.7 | 20.2 |

TABLE 8

Integrated square error after $N/\tau_0$ time steps for tapered mesh, $\tau_0 = \frac{3}{2}$

| N | d = 2 | d = 4 | d = 6 | d = 8 |
|---|---|---|---|---|
| 18 | $5.1 \times 10^{-3}$ | | | |
| 36 | $1.3 \times 10^{-4}$ | $1.6 \times 10^{-8}$ | $7.5 \times 10^{-13}$ | $3.6 \times 10^{-14}$ |
| 54 | $1.6 \times 10^{-5}$ | $3.3 \times 10^{-10}$ | $9.2 \times 10^{-16}$ | $3.9 \times 10^{-18}$ |
| 72 | $3.6 \times 10^{-6}$ | $3.0 \times 10^{-11}$ | $6.0 \times 10^{-17}$ | $9.1 \times 10^{-21}$ |
| 90 | $1.2 \times 10^{-6}$ | $4.9 \times 10^{-12}$ | $5.0 \times 10^{-18}$ | $1.0 \times 10^{-22}$ |
| 108 | $5.0 \times 10^{-7}$ | $1.1 \times 10^{-12}$ | $6.1 \times 10^{-19}$ | $2.8 \times 10^{-24}$ |
| 126 | $2.4 \times 10^{-7}$ | $3.3 \times 10^{-13}$ | $9.9 \times 10^{-20}$ | $9.6 \times 10^{-26}$ |
| 144 | | $1.1 \times 10^{-13}$ | $2.1 \times 10^{-20}$ | $2.4 \times 10^{-27}$ |
| Convergence | 5.1 | 8.5 | 12.1 | 22.4 |

(ii) Inhomogeneous Boundary Conditions

With inhomogeneous BCs, the $c_i$ of Equations (46)-(48) do not vanish. For a numerical example, the present invention again selects the exemplary solution:

$$\psi(x,t) = \cos 2\pi(x-t), \quad (62)$$

without using a cyclic mesh to establish periodic BCs. Instead, the present invention uses the general BC projection technique of enforcing the correct values $\nabla^{2k}\psi(x, t)$ at $x=0, 1$ with $k=0, \ldots, d/2$, where d is the degree of the discretization. (This is an inhomogeneous Dirichlet BC). Results are stable with the same parameter values and tapered mesh as those for unequally spaced points. Results are tabulated in Tables 9 and 10. Errors are somewhat larger than the results with homogeneous BCs, but the convergence rates are comparable.

TABLE 9

Integrated square error after $N/\tau_0$ time steps for tapered mesh with inhomogeneous BC, $\tau_0 = \frac{1}{2}$

| N | d = 2 | d = 4 | d = 6 | d = 8 |
|---|---|---|---|---|
| 12 | $2.7 \times 10^{-3}$ | $5.7 \times 10^{-3}$ | | |
| 24 | $1.4 \times 10^{-4}$ | $2.3 \times 10^{-6}$ | $5.4 \times 10^{-10}$ | $1.3 \times 10^{-11}$ |
| 36 | $2.6 \times 10^{-5}$ | $2.8 \times 10^{-8}$ | $8.0 \times 10^{-13}$ | $2.4 \times 10^{-15}$ |
| 48 | $7.9 \times 10^{-6}$ | $1.4 \times 10^{-9}$ | $8.2 \times 10^{-15}$ | $6.9 \times 10^{-18}$ |
| 60 | $3.2 \times 10^{-6}$ | $1.4 \times 10^{-10}$ | $2.4 \times 10^{-16}$ | $1.8 \times 10^{-19}$ |
| 72 | $1.5 \times 10^{-6}$ | $2.3 \times 10^{-11}$ | $1.4 \times 10^{-17}$ | $4.8 \times 10^{-20}$ |
| 84 | $8.1 \times 10^{-7}$ | $5.0 \times 10^{-12}$ | $1.2 \times 10^{-18}$ | |
| 96 | | | $1.4 \times 10^{-19}$ | |
| Convergence | 4.2 | 10.7 | 15.9 | 18.2 |

TABLE 10

Integrated square error after $N/\tau_0$ time steps for tapered mesh with inhomogeneous BC, $\tau_0 = \frac{1}{2}$

| N | d = 2 | d = 4 | d = 6 | d = 8 |
|---|---|---|---|---|
| 18 | $7.6 \times 10^{-23}$ | | | |
| 36 | $2.3 \times 10^{-3}$ | $3.4 \times 10^{-6}$ | $2.0 \times 10^{-9}$ | $2.1 \times 10^{-11}$ |
| 54 | $2.4 \times 10^{-4}$ | $4.8 \times 10^{-8}$ | $3.6 \times 10^{-12}$ | $3.1 \times 10^{-15}$ |
| 72 | $4.9 \times 10^{-5}$ | $2.9 \times 10^{-9}$ | $5.7 \times 10^{-14}$ | $9.1 \times 10^{-18}$ |
| 90 | $1.5 \times 10^{-5}$ | $3.6 \times 10^{-10}$ | $2.5 \times 10^{-15}$ | $7.3 \times 10^{-19}$ |
| 108 | $5.9 \times 10^{-6}$ | $6.9 \times 10^{-11}$ | $2.1 \times 10^{-16}$ | |
| 126 | $2.7 \times 10^{-6}$ | $1.7 \times 10^{-11}$ | $2.6 \times 10^{-17}$ | |
| 140 | | $1.1 \times 10^{-12}$ | $4.4 \times 10^{-18}$ | |
| Convergence | 5.3 | 9.6 | 14.3 | 19.8 |

The results presented in section (I) show high-order convergence with stability that is not spoiled by the presence of small cells near the boundary. The results also exhibit the dramatic superiority in efficiency of high-order discretization. The present invention has taken the Lax-Wendroff approach that relates the fields at three time slices and uses only the field as the dynamic variable. It should be clear to one of ordinary skill in the art that the same approach can be used to generalize the formulation that relates the field and its first time derivative at two time slices:

$$\psi(\vec{x}, \Delta t) = \cosh\sqrt{(\Delta t)^2 \nabla^2}\, \psi(\vec{x}, 0) + \frac{\Delta t}{\sqrt{(\Delta t)^2 \nabla^2}} \sinh\sqrt{(\Delta t)^2 \nabla^2}\, \dot{\psi}(\vec{x}, 0), \quad (63)$$

$$\dot{\psi}(\vec{x}, \Delta t) = \cosh\sqrt{(\Delta t)^2 \nabla^2}\, \dot{\psi}(\vec{x}, 0) + \frac{\sqrt{(\Delta t)^2 \nabla^2}}{\Delta t} \sinh\sqrt{(\Delta t)^2 \nabla^2}\, \psi(\vec{x}, 0), \quad (64)$$

where $\dot{\psi}$ is the first time derivative of the field $\psi$. Instead of using two previous time-steps of the field to determine a new field, the combination of Equations (63) and (64) use one previous time step of the field in the field's first time derivative to determine the new field in its first time derivative. The combination of Equation (63) and (64) use the first time derivative of the field as an independent variable, similar to the Lagrangian formulations for mechanics. As before, one need not worry about any branch cuts, because the power series for the operators contain only integer powers of $(\Delta t)^2 \nabla^2$.

With respect to parameter selections, in general, for the solution to a given problem with a desired accuracy, it would be better to have justifiable procedure for selection of the many numerical parameters, including discretization density, degree of approximation, and time step. Regarding balance of pre-computation with propagation computation, as in frequency domain computations, there will be some tradeoffs between pre-computation and solution. For large problems, pre-computation will be dominated by the discretization of the boarder propagation, the boundary constraints, and the decomposition of the coefficient matrix $B_{ii'} = \Sigma_j b_{ij} b_{i'j}$, which appears in Equation (48). Because of its local structure, this decomposition can be accelerated by employing nested dissection. Nested dissection is disclosed in a publication by A. George, J. W. H. Liu, entitled, "Computer Solution of Large Sparse Positive Definite Systems," published by Prentice-Hall, Englewood Cliffs, N.J., 1981.

For the frequency problems, the use of wave discretizations that are specified by minimization of RMS error over some spectrum of sine waves (rather than exactitude for low-order polynomials) results in more efficient calculation for a given accuracy. The present invention has shown that use of a tapered mesh near the boundary does not prevent stability and can result in smaller discretization error, even in one dimension, which might be thought to be marginal utility. The methods provided in this section (I) are formulated in a manner that are extendable to implement in any number of dimensions. In the following section (II), the methods in section (I) are extended to two or more space dimensions plus the time dimension.

(II) Two or More Space Plus the Time Dimension (2+1)

In the previous section (I), it was described that consistent high-order discretization can make Lax-Wendroff method stable in the presence of small cells near the boundary in one space and one time dimension. Section (I) was a prescription of an explicit discretization of Equation (13) in one space dimension, along with a projection operator that enforces the desired boundary conditions. Numerical examples were illustrated that alternated the use of the resultant propagation and projection operators that provided stable results with discretization error that decreased as a high power of the discretization scale. An essential ingredient of that approach was recognizing the implicit identity operator ($L_0$) when Equation (13) was solved for $\psi(\vec{x}, \Delta t)$, which resulted in Equation (16). Discretizing $L_0$ by the same prescription as was used for $L_{\Delta t}$ resulted in a low pass filter that facilitated stability. In this section (II), the present invention describes an extension of the approach in section (I) to two space dimensions. Section (II) describes (a) generalized discretization prescription, which is then followed by (b) Propagation Operator in Bulk Region, (c) Propagation Operator In Border Region, and (d) Boundary Condition Projection Operator.

(a) Generalized Discretization Prescription

The generalized discretization prescription discretizes all the linear operators, which include the propagation operator $L_{\Delta t}$, interpolation, extrapolation, and differentiation operators. The field is assumed to be tabulated at a collection of points $\vec{x}_j$, which need not be (but mostly are) on a regular lattice. All operators acting on a field are discretized as follows. The result of a linear function $a$ on some known fields $f_k(\vec{x})$ (taken here to be polynomials) are denoted as $r_k$:

$$(a, f_k) = r_k. \quad (65)$$

Linear functions are approximated by:

$$(a, f_k) \approx \Sigma \hat{\alpha}_j f(\vec{x}_j). \quad (66)$$

The coefficients $\hat{\alpha}_j$ are computed by minimizing the weighted sum of squares:

$$\sum_j w_j \hat{\alpha}_j^2, \quad (62)$$

subject to the constraints that the result be exact for the field $f_k$:

$$\Sigma \hat{\alpha}_j f_k(\vec{x}_j) = r_k. \quad (68)$$

(Obviously, the number of discretization points used must not be less than the number of function $f_k$). The coefficients are given by:

$$\hat{\alpha}_j = \frac{1}{w_j} \sum_k \lambda_k f_k(\vec{x}_j), \quad (69)$$

where $\lambda_k$ solve $$\sum_k \left[ \sum_j \frac{1}{w_j} f_k(\hat{x}_j) f_k(\vec{x}_j) \right] \lambda_k = r_k \quad (70)$$

In case of equally-spaced points, the $w_j$ may be taken to be equal. For non-regular meshes, it seems reasonable to take $w_j$ to be the weights of a suitable (i.e., of order commensurate with that of the discretization) quadrature rule for the integral of a function over the propagation region. In one space dimension, this was shown to result in reduction of about an order of magnitude in discretization error for a typical range of discretization scales and orders.

In non-mathematical terms, suppose the time-evolution in a spatial domain S is to be computed with suitable initial conditions and boundary conditions on the boundary ∂S. The acts of the pre-computation may be summarized as follows:

Select the functions for which the discretization is to be exact. In the examples provided, the present invention selected all polynomials of degree not exceeding some chosen value d.

Determine the minimum stencil size for which the free space discretization will be stable.

Select discretization points in the spatial domain S. For most of S, these should be on a lattice, so that the propagation operator can be applied by convolution (The present invention has been used primarily on square lattices, but it is conceivable that discretization on a triangular lattice could be somewhat more efficient because of higher symmetry). An irregular mesh may be used to better resolve the field near the boundary ∂S.

Classify the discretization points as "bulk" or "border." Bulk points are those for which each point of the stencil of the propagation operator corresponds to a discretization point on the square lattice. Border points are the rest.

For each of the border points, compute a discretization of the propagation operator using the point itself and its neighbors. In some cases, with the present invention it has been found that it is necessary to use more neighbors in the border region than in the bulk stencil to preserve stability. For a few cases (with high discretization order and Neumann boundary condition), even the number of discretization points in the bulk had to be increased. This did not occur in the (1+1)/d examples in the above described section (I).

Select points on the boundary, and using neighboring discretization points, compute differentiators/extrapolators to the selected points on the boundary for the desired boundary conditions. For example, for Dirichlet conditions, construct extrapolators for the field, and integer powers of $\nabla^2$.

Decompose the outer product of the constraint vectors so that the projection operator can be applied efficiently.

(b) Propagation Operator in Bulk Region

For efficiency in pre-computation and convolution, most of the propagation domain is discretized by tabulation of the field on a non-limiting, exemplary, square lattice:

$$\psi_{ijn} \approx \psi(i\Delta x, j\Delta x, n\Delta t). \tag{71}$$

The propagation operator, $$L_{\Delta t} \equiv \cos h \sqrt{(\Delta t)^2 \nabla^2}, \tag{72}$$

is discretized according to the general procedure above. The result of applying $L_{\Delta t}$ to polynomial "testing" functions is (evaluated at the origin):

$$* L_{\Delta t} x^n y^m)(0, 0, t) = (\Delta t)^{m+n} A(m, n) X\left(\frac{m+n}{2}\right), \tag{73}$$

where $$A(m, n) \equiv \frac{1}{2\pi} \int_0^{2\pi} d\theta \cos^m(\theta) \sin^n(\theta) \tag{74}$$

$$= \begin{cases} \frac{(m-1)!!(n-1)!!}{2^{\frac{m+n}{2}}\left(\frac{m+n}{2}\right)!}, & m \text{ and } n \text{ even,} \\ 0, & \text{otherwise,} \end{cases} \tag{75}$$

and

-continued $$X(m) \equiv (2m)^2 \int_0^\infty dx\, x^{2m-1} \log\frac{\sqrt{1-x^2}+1}{x} = \frac{[(2m)!!]^2}{(2m)!}. \tag{76}$$

In the above equations, !! denotes double factorial. The values of Equation (73) are used to compute the coefficients associated with the nearest M lattice points to the origin, so that $$(L_{\Delta t}\psi)(x, y, t) \approx \sum_{ij} \hat{L}_{ij}(\tau)\psi(x + i\Delta x, y + j\Delta x, t), \tag{77}$$

where $\tau=\Delta t/\Delta x$. In order to make the discretization exact for all polynomials of degree not greater than d, M must be as large as the number (d+1)(d+2)/2 of such polynomials. As in one dimension, it must usually be greater to give stable propagation. In addition, the stencil is set to have a "square" ($D_4$) symmetry to allow the values of M to be {5, 9, 13, 21, 25, 29, 37, 45, 49, 57, 61, 69, 81, 89, 97, ...}. The following function is used to determine if a discretization of the propagation operator L is stable:

$$\hat{\alpha}(k_x, k_y, \tau) \equiv \sum_{ij} \hat{L}_{ij} \cos(k_x i)\cos(k_y j). \tag{78}$$

As in one dimension, propagation is stable only if both $$|\hat{\alpha}(k_x,k_y,\tau) \pm \sqrt{\hat{\alpha}^2(k_x,k_y,\tau) - \hat{\alpha}(k_x,k_y,0)}| \le 1 \tag{79}$$

for all $\pi \le k_x, k_y \le \pi$ (the first Brillouin zone). If a particular discretization is unstable, a larger value of M must be used.

(c) Propagation Operator in the Border Region

In the border region, the propagation operator is discretized differently than in the bulk because (by definition) a bulk stencil centered on a border point will not entirely overlay discretization points. However, the requirement that the discretization operator provide a correct answer (Equation (73)) for polynomials up to the selected degree remains the same. The general discretization method described above within this section (II) is used, selecting the near-neighbor discretization points to each border point (these will usually include both border and bulk points). In general, this must be done independently for each border point, but symmetries of the problem and the discretization point set could be used to reduce the necessary pre-computations. The number of points used can be the same as that (M) in the bulk region, but in some cases, it has been found empirically that more points are necessary to avoid instability. If a finer discretization were used near the boundary, one would expect this necessity to have a greater tendency to occur.

(d) Boundary Condition Projection Operator

The boundary condition projection operator computations for two or more dimensions exhibit the biggest change from one dimensional space because in one dimension, there are only two boundary points. In two dimensions, there is a need to select a set of points on the boundary ∂S at which to impose the boundary conditions. A reasonable approach is to take their separation to be commensurate with the spacing of discretization points near the boundary. For example, with the discretization points all on a square lattice, the present invention uses boundary points along aS separated by the distance nearly equal to the lattice constant. In the case of a non-uniform mesh, points separated on the boundary by a distance commensurate with the smallest spacing in the nearby propagation region would be appropriate. For each boundary point, extrapolation/differentiation estimators are computed for the quantities constrained by desired boundary condition, and powers of the Laplacian operating on these. For example, for Dirichlet conditions, one computes estimators for $$\nabla^{2p}\psi(\vec{x}) \approx \sum_i b_i \psi(\vec{x}_i) \tag{80}$$

for p=0, . . . ,[d/2], $\vec{x}$ is a boundary point, d is the degree of the discretization, and the sum is taken over those i for which $\vec{x}_i$ is a near neighbor of $\vec{x}$. For Neumann conditions, the present invention uses computed estimators for the dot product $\nabla^{2p}$ $\hat{n}\cdot\nabla\psi(\hat{x})$, where $\hat{n}$ is the normal to $\partial S$ and p=0, . . . ,[d/2]. In the discretization of boundary conditions, the present invention has always used the same number of points $\vec{x}_j$ as used for the propagation operator in the border region, which may be greater than the number used in the bulk region, as described in this section (c) above. Labeling the constraint vectors for all discretization points $\vec{x}$ on the boundary and all p by an index l, the discretized boundary conditions are as follows, $$\sum_i b_{li} \psi(\vec{x}_i) = c_l. \tag{81}$$

For each boundary point, there will be multiple values of the index l. For example, for a discretization of degree d=2 and Dirichlet boundary conditions, there will be two values of l for each point, one to enforce the correct value of $\psi$, and the other to enforce the correct value of $\nabla^2\psi$. Of course, for homogeneous boundary conditions the $c_l$ vanish. To apply inhomogeneous boundary conditions, one must have high-order approximations to powers of $(\partial/\partial t)^2$ acting on the boundary conditions. Application of projection operators is facilitated by decomposing the outer product matrix, $$B_{lm} = \Sigma b_{li} b_{mi}, \tag{82}$$

so those linear equations with the coefficient matrix B can be solved quickly. By virtue of the locality of the boundary conditions, the matrix B is sparse and is amenable to sparse decomposition by nested dissection. Then, to apply the projection operator to a particular vector $\psi$, the present invention solves for the coefficient $\alpha_l$, $$\sum_m B_{lm}\alpha_m = c_l - \sum_i b_{li}\psi(\vec{x}_i), \tag{83}$$

and makes the replacement, $$\psi(\vec{x}_i) \leftarrow \psi(\vec{x}_i) + \sum_l \alpha_l b_{li}. \tag{84}$$

Having discretization of all the operators, time stepping is done by alternating the application of the discretization of the evolution formula $$\psi(\vec{X},\Delta t) = 2L_{\Delta t}\psi(\vec{X},\Delta t) - L_0\psi(\vec{X},t-\Delta t) \tag{85}$$

with the discretization of the boundary projection operation, $$\psi(\vec{X},\Delta t) \leftarrow P_b\psi(\vec{X},\Delta t), \tag{86}$$

as described above. The discretization of the identity operator $L_0$ is a high-order low-pass filter. As emphasized in section (I), this notation is not arbitrary; $L_0$ is exactly $\Delta t \to 0$ limit of $L_{\Delta t}$, and likewise for their discretization.

(6) Results

In this section, the results are provided for the present invention in the context of four examples of the methods for two space dimensions and one time dimension, exhibiting discretizations of various degrees (2-8) that give stable results, and the convergence of discretization error with density of sample points. The bulk propagation is studied first on a square region with periodic boundary conditions (BCs). Next, the two examples are provided with homogeneous BCs, a square with Dirichlet BCs on two opposite sides and Neumann BCs on the other two, and a disk with Neumann BCs. Finally, an example of inhomogeneous BCs is provided: a plane wave solution with Dirichlet BCs on a circle.

(i) Bulk Propagation

The stencils for d=2, $\tau=\Delta t/\Delta x=1$, and M=21 are as follows:

$$\hat{L}_1 = \begin{pmatrix} 0 & 0.0268657 & 0.0656716 & 0.0268657 & 0 \\ 0.0268657 & 0.143284 & 0.18209 & 0.143284 & 0.0268657 \\ 0.0656716 & 0.18209 & 0.220896 & 0.18209 & 0.0656716 \\ 0.0268657 & 0.143284 & 0.18209 & 0.143284 & 0.0268657 \\ 0 & 0.0268657 & 0.0656716 & 0.0268657 & 0 \end{pmatrix}, \tag{87}$$

and $$\hat{L}_0 = \begin{pmatrix} 0 & -0.0141791 & 0.00895522 & -0.041791 & 0 \\ -0.041791 & 0.110448 & 0.161194 & 0.110448 & -0.041791 \\ 0.00895522 & 0.161194 & 0.21194 & 0.161194 & 0.00895522 \\ -0.041791 & 0.110448 & 0.1611194 & 0.110448 & -0.041791 \\ 0 & -0.041791 & 0.00895522 & -0.041791 & 0 \end{pmatrix}. \tag{88}$$

Figure 3:
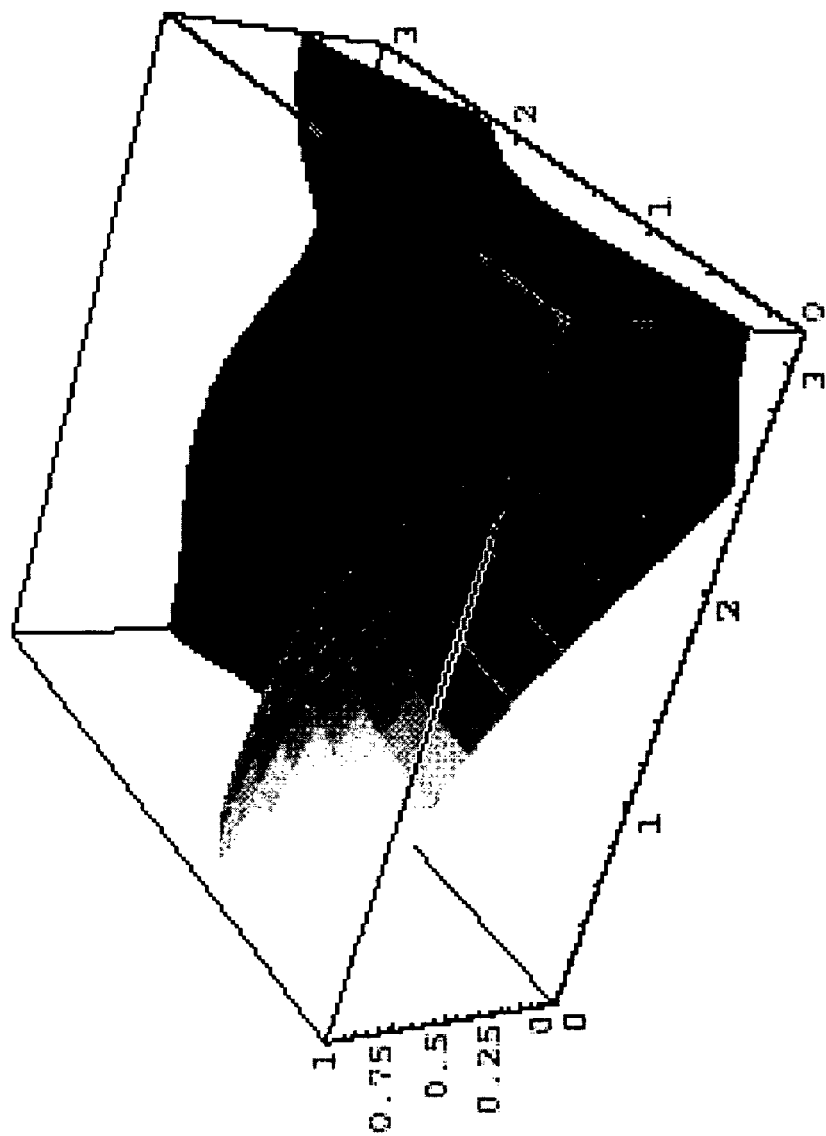
FIG. 3 is an exemplary graphical illustration for a stability function for stencils in accordance with the present invention.
Figure 4:
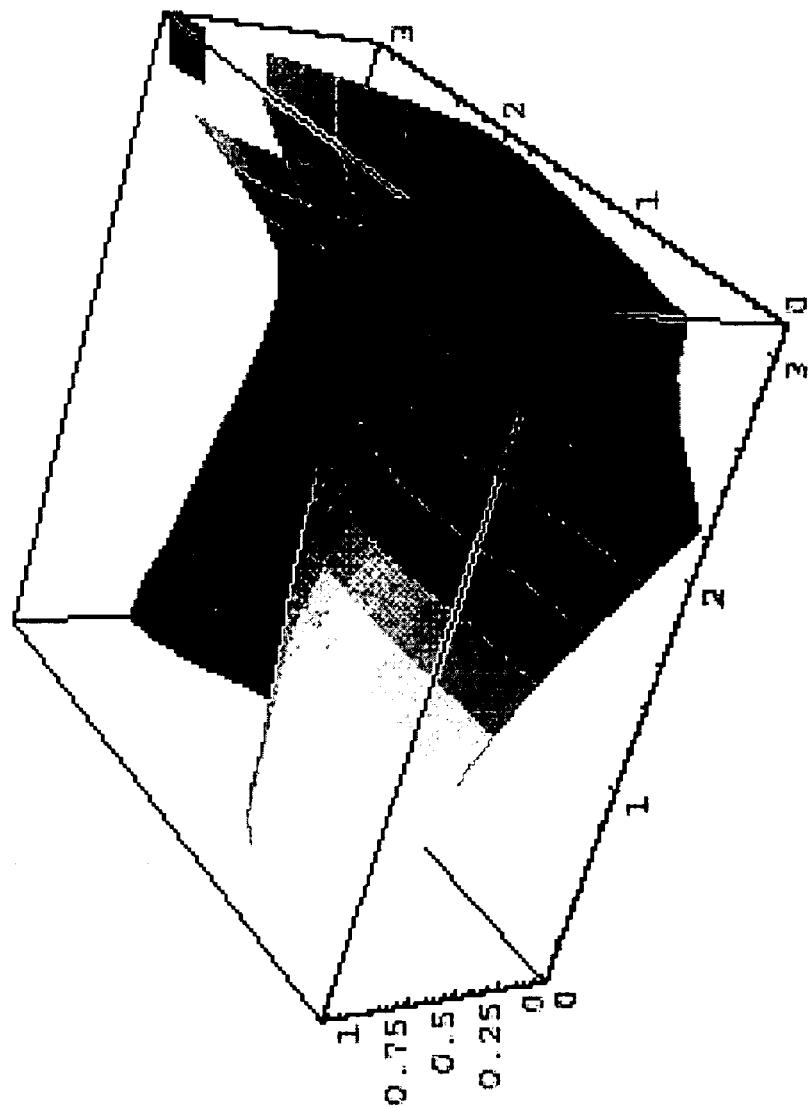
FIG. 4 is an exemplary graphical illustration for a stability function for the stencils with stencil radii, M=13, in accordance with the present invention.

These are the smallest stencils (for the given values d and $\tau$) that result in stable propagation. In FIG. 3, the stability function, $$\eta(k_x,k_y) = \max|\hat{\alpha}(k_x,k_y,\tau) \pm \sqrt{\hat{\alpha}^2(k_x,k_y,\tau) - \hat{\alpha}(k_x,k_y,0)}|, \tag{89}$$

is shown. Since $\eta(0,0)=1$ and $S(k_x,k_y)<1$ for all other values of $k_x$, $k_y$, the propagation is stable. As a contrast, the stability function for M=13 is plotted in FIG. 4. Near the corner of the Brillouin zone, $k_x=k_y=\pi$, it exceeds 1, indicating instability.

In Table 11, the stencil sizes for $\tau=1$ and $2 \leq d \leq 8$ are listed. The convergence of the discretization is examined by computing the deviation from the exact solution, $$\psi(x,y,t) = \cos(2\pi x)\sin(4\pi y)\cos(2\sqrt{5}\pi t). \tag{90}$$

Figure 5:
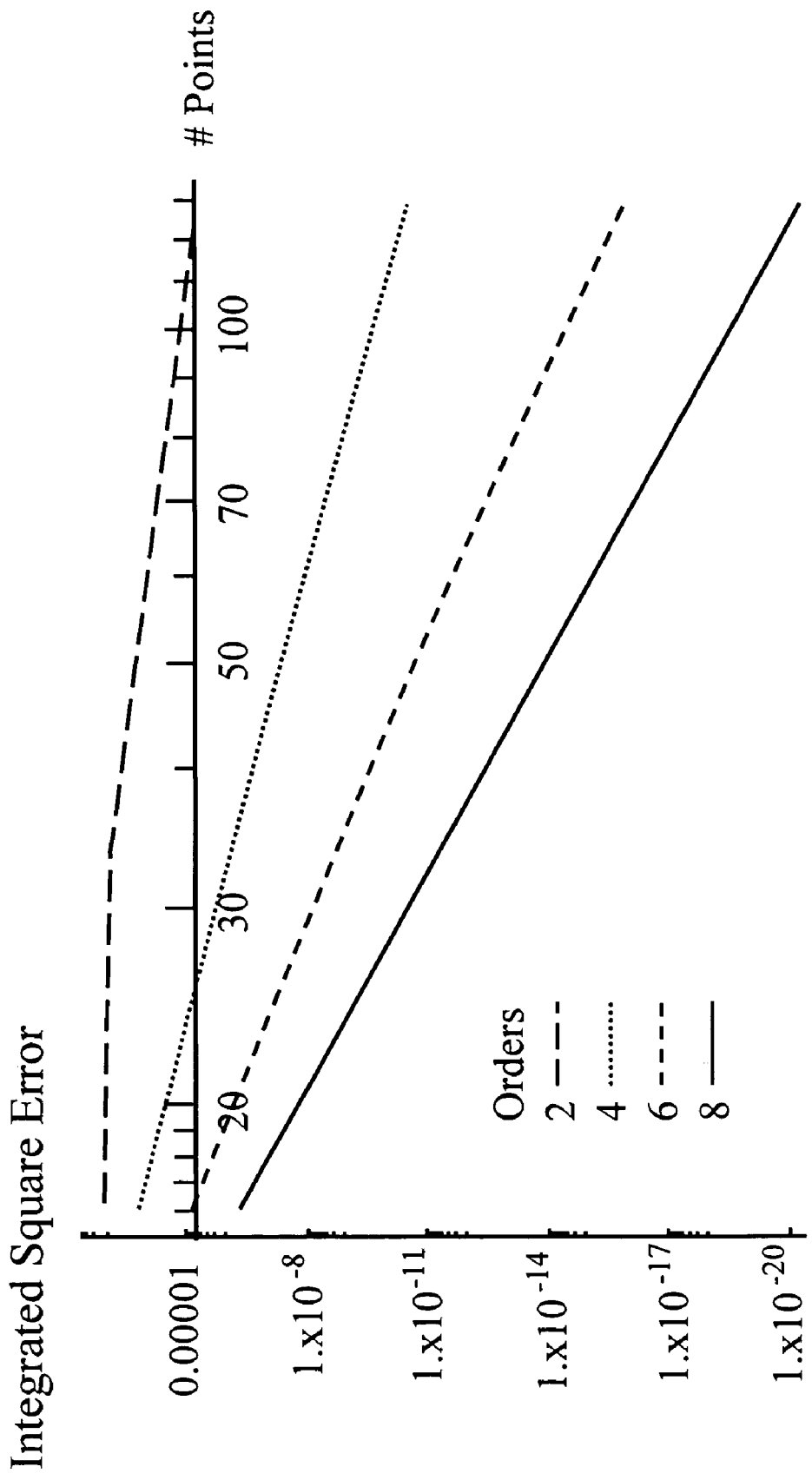
FIG. 5 is an exemplary graphical illustration showing integrated square error for a square grid for periodic boundary conditions, in accordance with the present invention.

A tabulation of the integral of the square of the error as a function of the number N of discretization points in each direction is given in Table 12 for various orders of discretization and $\pi=\Delta t/\Delta x=1$. Periodic boundary conditions were enforced in the usual manner. All calculations were done in machine precision (64 bit reals). Numbers smaller than $10^{-16}$ appear because of the squaring of the error. The domain of propagation is $0 \leq x, y \leq 1$ and N/2 time steps are used so that the solution is computed up to $t=\frac{1}{2}$. The convergence values given in the Tables are p, determined by the fit of the integrated square error $\epsilon^2 = cN^{-p}$ for the range of N. The same data are plotted in FIG. 5. All discretizations were verified to be stable by running for thousands of time steps from white noise initial conditions and monitoring $\int \psi^2(x,y,t) dx dy$.

TABLE 11

Minimum Stencil sizes M needed for stability ($\tau = 1$)

| D | M |
|---|---|
| 2 | 21 |
| 4 | 25 |
| 6 | 49 |
| 8 | 81 |

TABLE 12

Integrated square error at $t = \frac{1}{2}$ (N/2 steps) for a square grid, periodic BCs

| N | d = 2 | d = 4 | d = 6 | d = 8 |
|---|---|---|---|---|
| 16 |  | $2.6 \times 10^{-4}$ | $7.1 \times 10^{-6}$ | $7.2 \times 10^{-7}$ |
| 32 | $1.1 \times 10^{-3}$ | $2.0 \times 10^{-6}$ | $3.1 \times 10^{-9}$ | $2.6 \times 10^{-11}$ |
| 48 | $3.0 \times 10^{-4}$ | $8.9 \times 10^{-8}$ | $2.7 \times 10^{-11}$ | $4.8 \times 10^{-14}$ |
| 64 | $1.1 \times 10^{-4}$ | $9.4 \times 10^{-9}$ | $9.0 \times 10^{-13}$ | $5.2 \times 10^{-16}$ |
| 80 | $4.6 \times 10^{-5}$ | $1.6 \times 10^{-9}$ | $6.3 \times 10^{-14}$ | $1.5 \times 10^{-17}$ |
| 96 | $2.3 \times 10^{-5}$ | $3.8 \times 10^{-10}$ | $7.2 \times 10^{-15}$ | $8.4 \times 10^{-19}$ |
| 112 | $1.3 \times 10^{-5}$ | $1.1 \times 10^{-10}$ | $1.1 \times 10^{-15}$ | $7.4 \times 10^{-20}$ |
| 128 | $7.5 \times 10^{-6}$ | $3.9 \times 10^{-11}$ | $2.3 \times 10^{-16}$ | $1.1 \times 10^{-20}$ |
| Convergence | 3.7 | 7.6 | 11.6 | 15.4 |

(ii) Square Region with Mixed Homogeneous BCs

In this section, numerical results are provided for the wave equation in a square domain with homogeneous Dirichlet BCs on two opposing sides (x=0 and x=1) and homogeneous Neumann conditions on the other two sides (y=0 and y=1). In the context of the present invention the error is computed by deviation from the exact solution, $$\psi(x,y,t) = \sin \pi x \cos \pi y \cos \sqrt{2} \pi t. \tag{91}$$

Figure 6:
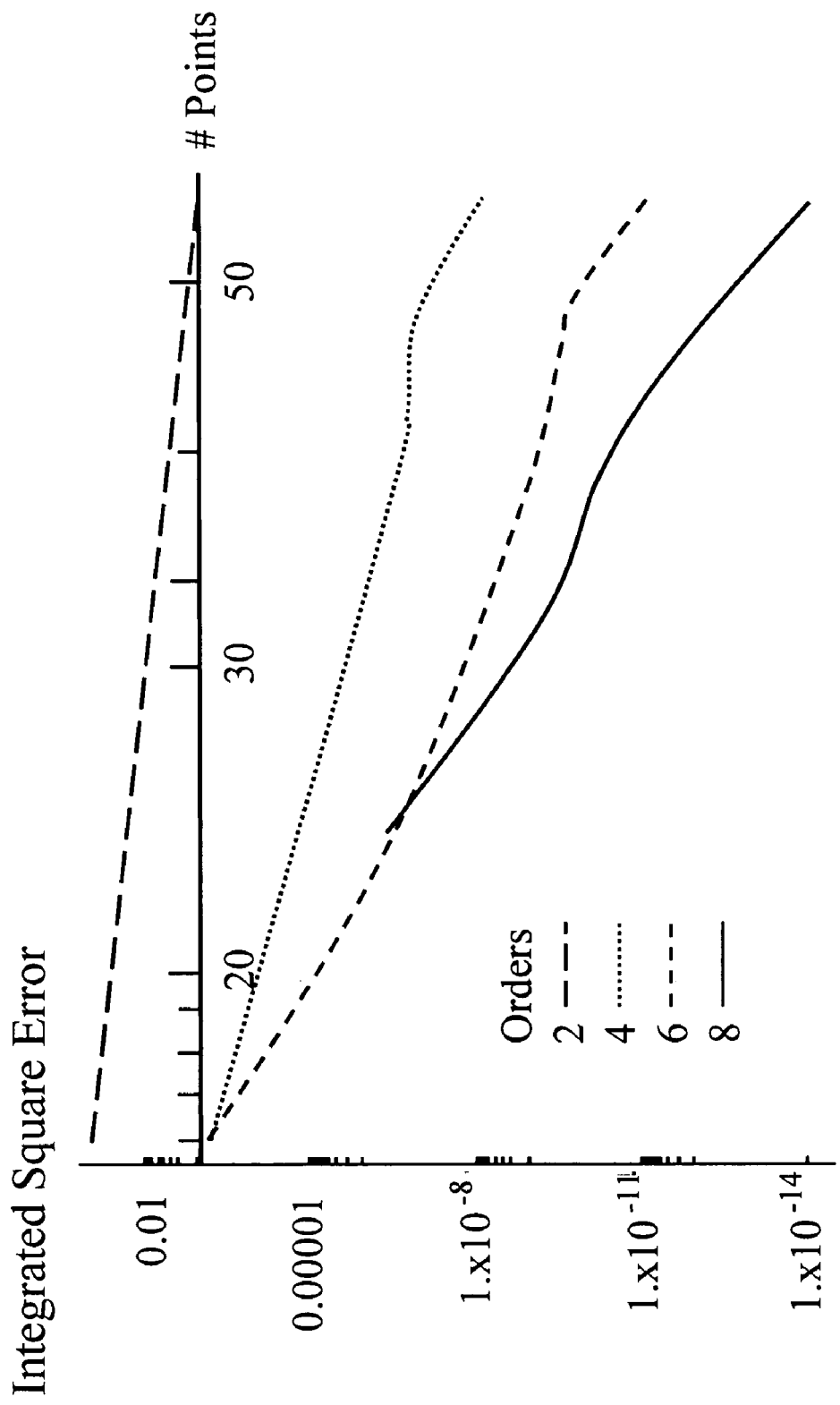
FIG. 6 is an exemplary graphical illustration for integrated square error for a square grid for mixed boundary conditions, in accordance with the present invention.

In order to achieve stability, it was necessary to use more points for the discretization of the border propagation and boundary condition operators for all degrees of discretization. For degrees 6 and 8, more points in the bulk region were also required. The same number of points was used for all these discretizations. The number of points used is tabulated in Table 13. Tabulations of the integral of the square of the error as a function of the number N of discretization points in each direction are given in Table 14 for various orders of discretization and $\tau=1$. The convergence values given in the Table are p, determined by the fit of the integrated square error $\epsilon^2 = cN^{-p}$ for the range of N. The same data are plotted in FIG. 6. All discretizations were verified to be stable by running for hundreds of time steps from white noise initial conditions and monitoring $\int \psi(x,y,t)^2 dx dy$.

TABLE 13

Number of points used for the discretization of boarder propagation and boundary condition operators in square propagation region, and the amount by which these exceed the number of points used for the bulk propagation operator.

| D | M | M − $M_{bulk}$ |
|---|---|---|
| 2 | 21 | 0 |
| 4 | 33 | 8 |
| 6 | 89 | 32 |
| 8 | 163 | 64 |

TABLE 14

Integrated square error at $\tau = 1$, mixed BCs

| N | d = 2 | d = 4 | d = 6 | d = 8 |
|---|---|---|---|---|
| 16 | $6.9 \times 10^{-2}$ | $5.6 \times 10^{-4}$ | $5.7 \times 10^{-4}$ |  |
| 24 | $1.4 \times 10^{-2}$ | $2.0 \times 10^{-5}$ | $3.9 \times 10^{-7}$ | $4.6 \times 10^{-7}$ |
| 32 | $5.5 \times 10^{-3}$ | $1.3 \times 10^{-6}$ | $7.3 \times 10^{-9}$ | $6.0 \times 10^{-10}$ |
| 40 | $2.9 \times 10^{-3}$ | $1.7 \times 10^{-7}$ | $5.5 \times 10^{-10}$ | $2.7 \times 10^{-11}$ |
| 48 | $1.5 \times 10^{-3}$ | $9.0 \times 10^{-8}$ | $1.7 \times 10^{-10}$ | $4.4 \times 10^{-13}$ |
| 56 | $1.1 \times 10^{-3}$ | $7.3 \times 10^{-9}$ | $8.0 \times 10^{-12}$ | $7.2 \times 10^{-15}$ |
| Convergence | 3.3 | 8.7 | 13.8 | 20.5 |

(iii) Circular Region with Homogeneous Neumann BCs

In this section, numerical results are provided for the wave equation in a circular domain with homogeneous Neumann conditions at $\tau=a=1.84118$ (the first root of $J_1'(r)$). The present invention computed the error as the deviation from the exact solution, $$\psi(r,t) = J_0(r) \cos t. \tag{92}$$

Figure 7:
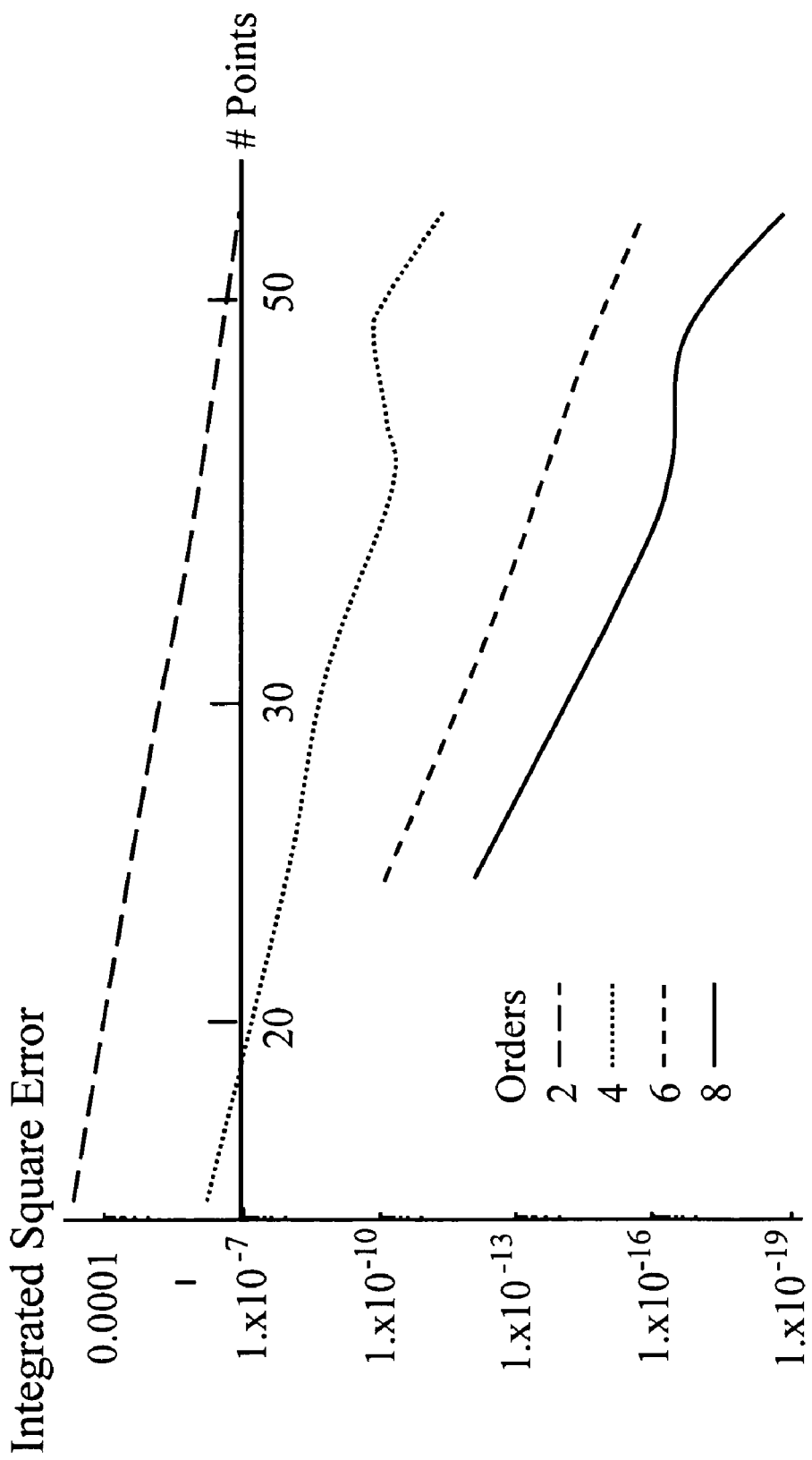
FIG. 7 is an exemplary graphical illustration for integrated square error for circular boundary with Neumann conditions, in accordance with the present invention.

The circular region of propagation is inscribed in an N×N square grid. The range of time was $0 \leq t \leq 2\pi$. The value of $\tau$ changed somewhat so that $t=2\pi$ was reached in an integral number of time steps. For sparse discretization, values of $\tau$ were somewhat less than 1, approaching one as more points were used. Again, it was necessary to use more points (than those used for periodic BCs) for the discretization of the operators. The same number of points M were used for all these discretization of border propagation operators and boundary projection operators. The number of points used is tabulated in Table 15. For computation of the degree 8 discretization coefficients, extended precision arithmetic was used. All time-stepping was done in normal double precision. Tabulations of the integral of the square of the error as a function of the number N of discretization points in each direction are given in Table 16 for various orders of discretization and $\tau=1$. They are plotted in FIG. 7. The convergence values given in the Tables are p, determined by the fit of the integrated square error $\epsilon^2 = cN^{-p}$ for the range of N.

TABLE 15

Number of points used for the discretization of boarder propagation and boundary condition operators in circular propagation region with homogeneous Neumann BCs, and the amount by which these exceed the number of points used for the bulk propagation operator.

| D | M | M − $M_{bulk}$ |
|---|---|---|
| 2 | 21 | 0 |
| 4 | 33 | 8 |

TABLE 15-continued

Number of points used for the discretization of boarder propagation and boundary condition operators in circular propagation region with homogeneous Neumann BCs, and the amount by which these exceed the number of points used for the bulk propagation operator.

| D | M | M − $M_{bulk}$ |
|---|---|---|
| 6 | 65 | 32 |
| 8 | 193 | 96 |

TABLE 16

Integrated square error at τ = 1, mixed BCs

| N | d = 2 | d = 4 | d = 6 | d = 8 |
|---|---|---|---|---|
| 16 | $4.0 \times 10^{-4}$ | $4.5 \times 10^{-7}$ | | |
| 24 | $3.0 \times 10^{-5}$ | $8.2 \times 10^{-9}$ | $6.0 \times 10^{-11}$ | $8.6 \times 10^{-13}$ |
| 32 | $3.0 \times 10^{-6}$ | $9.2 \times 10^{-10}$ | $4.2 \times 10^{-13}$ | $1.7 \times 10^{-15}$ |
| 40 | $8.4 \times 10^{-7}$ | $15.1 \times 10^{-11}$ | $2.0 \times 10^{-14}$ | $4.6 \times 10^{-17}$ |
| 48 | $2.8 \times 10^{-7}$ | $1.4 \times 10^{-10}$ | $1.9 \times 10^{-15}$ | $1.9 \times 10^{-17}$ |
| 56 | $1.1 \times 10^{-7}$ | $3.3 \times 10^{-12}$ | $1.3 \times 10^{-16}$ | $1.4 \times 10^{-19}$ |
| Convergence | 6.6 | 8.7 | 15.0 | 17.1 |

(iv) Circular Region with Inhomogeneous Dirichlet BCs

Figure 8:
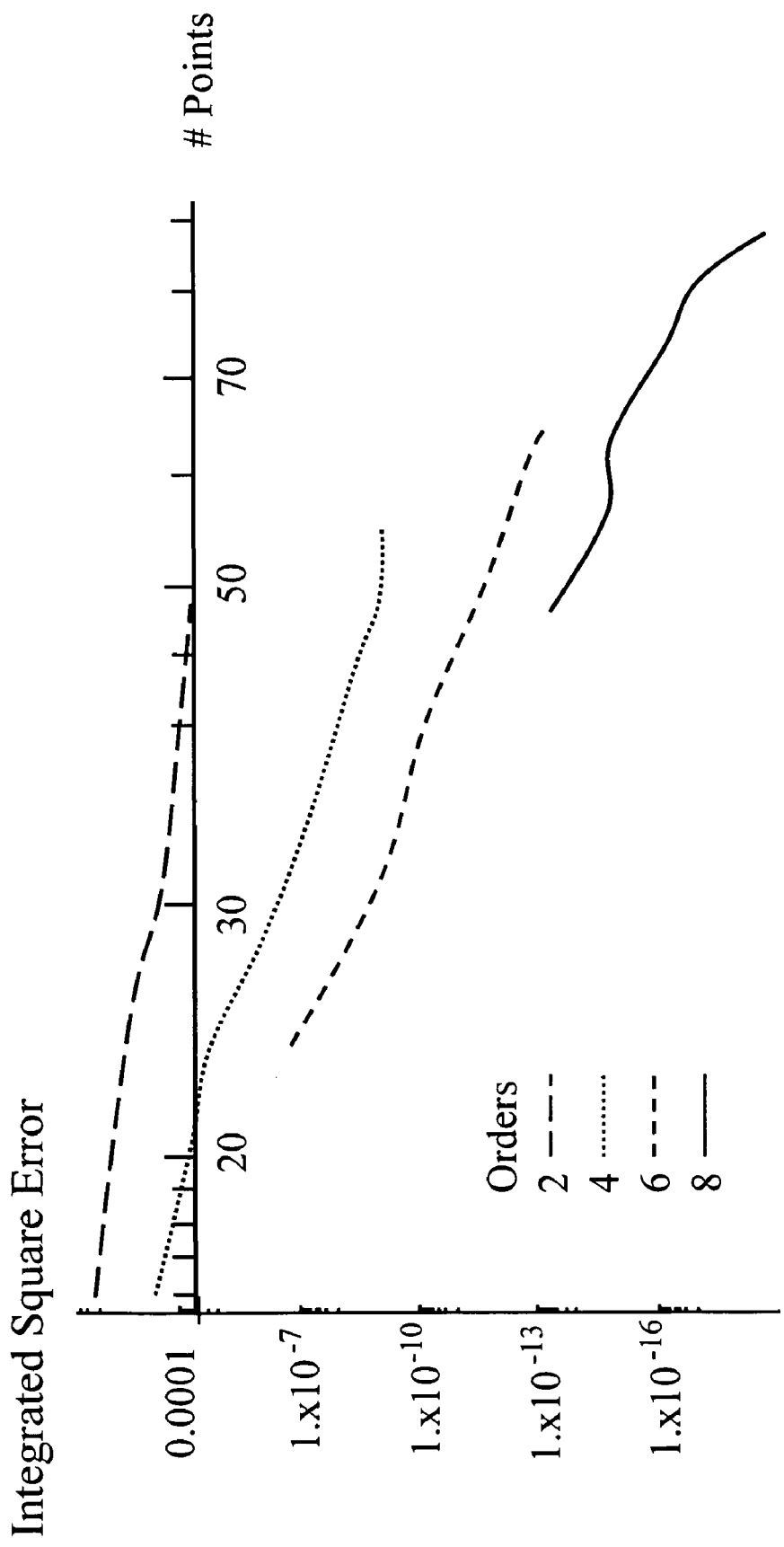
FIG. 8 is an exemplary graphical illustration for integrated square error for circular boundary with inhomogeneous Dirichlet conditions, in accordance with the present invention.

Finally, the present invention provides results for a plane wave, $$\psi(x,y,t) = \cos \pi(x-t), \quad (93)$$

using inhomogeneous Dirichlet BCs on a circle of radius 1. As in the previous example, the range of time was $0 \leq t \leq 2\pi$ and value of c changed somewhat so that $t = 2\pi$ was reached in an integral number of time steps. The number of points used is tabulated in Table 17. For computation of the degrees 6 and 8 discretization coefficients, extended precision arithmetic was used. All time-stepping was done in normal double-precision. Note that, for degree 8, fewer points were required than for homogeneous Neumann conditions (above section (iii)). This is significant because one might think it harder to achieve stability with inhomogeneous BCs. Instead, it seems that inhomogeneous BCs are no harder than homogeneous ones, but that Dirichlet BCs are easier than Neumann BCs. Tabulations of the integral of the square of the error as a function of the number N of discretization points in each direction are given in Table 18 for various orders of discretization and τ=1. They are plotted in FIG. 8. The convergence values given in the tables are p, determined by the fit of the integrated square error $\epsilon^2 = cN^{-p}$.

TABLE 17

Number of points used for the discretization of boarder propagation and boundary condition operators in circular propagation region with inhomogeneous Dirichlet BCs, and the amount by which these exceed the number of points used for the bulk propagation operator.

| D | M | M − $M_{bulk}$ |
|---|---|---|
| 2 | 21 | 0 |
| 4 | 33 | 8 |
| 6 | 65 | 16 |
| 8 | 129 | 118 |

TABLE 18

Integrated square error at τ ≈ 1, circular boundary with inhomogeneous Dirichlet conditions

| N | d = 2 | d = 4 | d = 6 | d = 8 |
|---|---|---|---|---|
| 16 | $4.0 \times 10^{-4}$ | $4.5 \times 10^{-7}$ | | |
| 24 | $3.0 \times 10^{-5}$ | $8.2 \times 10^{-9}$ | $6.0 \times 10^{-11}$ | $8.6 \times 10^{-13}$ |
| 32 | $3.0 \times 10^{-6}$ | $9.2 \times 10^{-10}$ | $4.2 \times 10^{-13}$ | $1.7 \times 10^{-15}$ |
| 40 | $8.4 \times 10^{-7}$ | $15.1 \times 10^{-11}$ | $2.0 \times 10^{-14}$ | $4.6 \times 10^{-17}$ |
| 48 | $2.8 \times 10^{-7}$ | $1.4 \times 10^{-10}$ | $1.9 \times 10^{-15}$ | $1.9 \times 10^{-17}$ |
| 56 | $1.1 \times 10^{-7}$ | $3.3 \times 10^{-12}$ | $1.3 \times 10^{-16}$ | $1.4 \times 10^{-19}$ |
| Convergence | 6.6 | 8.7 | 15.0 | 17.1 |

Although the invention has been described in language specific to structural features and or methodological steps, it is to be understood that the invention defined in the appended claims is not necessarily limited to the specific features or steps described. Rather, the specific features and steps are disclosed as desirable implementations of the claimed invention. Accordingly, while exemplary illustrative embodiments of the invention have been described, numerous variations and alternative embodiments will occur to those skilled in the art. For example, although the present invention has not used a tapered mesh, small cells are implicit because of the proximity of the boundary points to the border points. In addition, it should be noted that the method presented is formulated in a manner that is straightforward to implement in any number of dimensions. Further, it should be noted that the tapering of the mesh was not indicated because the examples provided by the present invention all have fields without singularities at the boundaries. For boundaries that induce singularities, efficiency and accuracy will depend on the choice of the border mesh. Such variations and alternate embodiments are contemplated, and can be made without departing from the spirit and scope of the invention.

What is claimed is:

1. A computer implemented method for numerical simulation of wave propagation in a media, comprising an act of causing a processor to perform acts of:
   discretizing propagation operators $L_{\Delta t}$ by using an identity that is derived using central differencing in time;
   providing a high-order discretization of a boundary projection operator that enforces boundary conditions independent of the discretization of the propagation operators $L_{\Delta t}$; and
   alternating an application of a discretization of an evolution formula having a spatial filtering operator $L_0$ with a boundary projection operation for stepping forward in time to determine wave propagation in the media; and
   generating a simulation of wave propagation in the media.

2. The method as set forth in claim 1, wherein discretizing the propagation operator $L_{\Delta t}$ further comprises the acts of:
   selecting a set of suitable functions for which discretization of the propagation operator $L_{\Delta t}$ is exact;
   determining a minimum stencil size M for which a free-space discretization is stable;
   selecting discretization points in a spatial domain S on a regular lattice;
   classifying the discretization points as either bulk points or border points, with the bulk points being those for which each point on a stencil of the propagation operator corresponds to a discretization point on the lattice, and border points are those points that remain;
   computing a discretization of the propagation operator for each of the border points using the border point and its neighbor points;

selecting points on a boundary, and using neighboring discretization points, computing differentiators and extrapolators to the selected points on the boundary for a selected boundary condition; and decomposing an outer product of constraint vectors for efficient application of the projection operator.

3. The method as set forth in claim 2, wherein the act of selecting a suitable function set for which discretization of the propagation operator $L_{\Delta t}$ is exact further comprises an act of selecting polynomials of degrees not exceeding a value d, where d is a degree of the polynomial.

4. The method as set forth in claim 2, wherein the act of determining a minimum stencil size M for which a free space discretization is stable, further comprises an act of setting M to a value greater than or equal to the number of linearly independent polynomials in spatial coordinates that are of degree not exceeding d, where M is a minimum stencil size; and d is a degree of a polynomial.

5. The method as set forth in claim 2, wherein the act of selecting discretization points in a spatial domain S on a regular lattice further comprises an act of selecting points such that they are on a lattice selected from a group consisting of a square lattice and a triangular lattice.

6. The method as set forth in claim 2, further comprising an act of discretizing the propagation operator $L_{\Delta t}$ for each bulk point according to the following:

$$(L_{\Delta t}\psi)(x, y, t) \approx \sum_{ij} \hat{L}_{ij}(\tau)\psi(x + i\Delta x, y + j\Delta x, t),$$

where $$(L_{\Delta t}\psi)(x, y, t) = L_{\Delta t}(x, y, t)[\psi(x, y, t)];$$

$L_{\Delta t}(x, y, t)$ is a propagation operator in space and time dimensions;

$\psi(x, y, t)$ is a field operand in two dimension spaces, and one time dimension;

$\hat{L}_{ij}(\tau)$ is a discretized propagation operator, which is set to M numbers, which are values of numbers to provide symmetry with respect to any selected point i,j on a grid, with $\tau = \Delta t/\Delta x$;

$\psi(x+i\Delta x, y+j\Delta x, t)$ is a discretized field $\psi(x, y, t)$ in two dimensions of space;

$i\Delta x$ is a first spatial coordinate in a first direction, where i is an integer valued first grid coordinate number representing a specific point in a bulk region;

$j\Delta x$ is a second spatial coordinate in second direction, where j is an integer valued second grid coordinate number representing the specific point in a bulk region; and $\Delta x$ is a spatial discretization interval.

7. The method as set forth in claim 2, wherein the act of computing a discretization of the propagation operator for each of the border points further comprises an act of computing a discretization according to the following:

$$(L_{\Delta t}\psi)(x_b, y_b) \approx \sum_{neighbors(x,y)} \hat{L}_{ij}(x_b, y_b)\psi(x, y)$$

where:

$(L_{\Delta t}\psi)(x_b, y_b)$ is the field resulting from the application of the propagation operator evaluated at the border point $(x_b, y_b)$;

$L_{\Delta t}(x, y)$ is a propagation operator in two dimension spaces x and y;

$\psi(x, y)$ is a field operand in two dimension spaces x and y, which acts as an operator for the operand $(x_b, y_b)$;

$x_b$ is a border point in a first dimension;

$y_b$ is a border point in a second dimension;

x and y are neighbor points of the border points $x_b$ and $y_b$;

$\hat{L}_{ij}(x_b, y_b)$ is a discretized propagation operator at border points; and $\psi(x, y)$ is a representation of a field in two dimension space for neighbor points x, y.

8. The method as set forth in claim 2, further comprising an act of discretizing boundary conditions according to the following:

$$\sum_i b_{li}\psi(\vec{x}_i) = c_l,$$

where:

$b_{li}$ are an expression of boundary conditions;

$\psi(\vec{x}_i)$ represents tabulation of a field at discretization points $\vec{x}_i$ on the boundary;

$c_l$ represents a homogeneous boundary condition if equal to zero, and non-homogeneous boundary condition otherwise;

l labels points on the boundary; and i labels points near the boundary.

9. The method as set forth in claim 2, wherein the act of decomposing an outer product of constraint vectors for efficient application of the projection operator further comprises an act of decomposing the outer product according to the following:

$$B_{lm} = \Sigma b_{li}b_{mi},$$

where:

$B_{lm}$ is an coefficient matrix; and $b_{li}$ is an expression of the boundary conditions.

10. The method as set forth in claim 2, wherein the act of decomposing an outer product of constraint vectors for efficient application of the projection operator, further comprises an act of applying the projection operator to a particular vector $\psi$ by solving for coefficient $\alpha_l$ according to the following:

$$\sum_m B_{lm}\alpha_m = c_l - \sum_i b_{li}\psi(\vec{x}_i),$$

and making a replacement according to the following:

$$\psi(\vec{x}_i) \leftarrow \psi(\vec{x}_i) + \sum_l \alpha_l b_{li}.$$

11. The method as set forth in claim 1, wherein the act of discretizing propagation operators $L_{\Delta t}$ by using an identity further comprises an act of using the identity of $$\frac{1}{2}[\psi(\vec{x}, \Delta t) + \psi(\vec{x}, \Delta t)] = L_{\Delta t}\psi(\vec{x}, 0) \equiv \cosh\sqrt{(\Delta t)^2 \nabla^2}\, \psi(\vec{x}, 0)$$

$$= \sum_{m=0}^{\infty} \frac{(\Delta t)^{2m} \nabla^{2m}}{(2m!)} \psi(\vec{x}, 0);$$

where an exact relation that relates fields $\psi(\vec{x},t)$ at multiple times without approximations is provided;
  wherein the act of providing a high-order discretization of a boundary projection operator further comprises an act of using the boundary projection operator of $$\psi(\vec{x},t) \leftarrow P_b \psi(\vec{x},t); \text{ and}$$

wherein alternating an application of a discretization of an evolution formula having a spatial filtering operator $L_0$ further comprises an act of using the spatial filtering operator $L_0$ of $$\psi(\vec{x},\Delta t) = 2L_{\Delta t}\psi(\vec{x},\Delta t) - L_0\psi(\vec{x}, t-\Delta t),$$

with a boundary projection operation for stepping forward in time to determine wave propagation in the media;
  where $$\nabla^2 = \frac{\partial^2}{\partial x^2} + \frac{\partial^2}{\partial y^2} + \frac{\partial^2}{\partial z^2}$$

denotes Laplace operator,
  $\psi(\vec{x},\Delta t)$ is a field quantity,
  $\vec{x}$ is dimensions of space in x, y, and z direction,
  $\Delta t$ is an increment of time,
  m is an index of summation,
  $L_0$ is a high-order spatial filtering operator, and
  $P_b$ is the boundary projection operator at a boundary b.
  12. The method as set forth in claim 11, wherein discretizing the propagation operator $L_{\Delta t}$ further comprises the acts of:
    selecting a set of suitable functions for which discretization of the propagation operator $L_{\Delta t}$ is exact;
    determining a minimum stencil size M for which a free-space discretization is stable;
    selecting discretization points in a spatial domain S on a regular lattice;
    classifying the discretization points as either bulk points or border points, with the bulk points being those for which each point on a stencil of the propagation operator corresponds to a discretization point on the lattice, and border points are those points that remain;
    computing a discretization of the propagation operator for each of the border points using the border point and its neighbor points;
    selecting points on a boundary, and using neighboring discretization points, computing differentiators and extrapolators to the selected points on the boundary for a selected boundary condition;
    decomposing an outer product of constraint vectors for efficient application of the projection operator;
    wherein the act of selecting a suitable function set for which discretization of the propagation operator $L_{\Delta t}$ is exact further comprises an act of selecting polynomials of degrees not exceeding a value d, where d is a degree of the polynomial;
    wherein the act of determining a minimum stencil size M for which a free space discretization is stable, further comprises an act of setting M to a value greater than or equal to the number of linearly independent polynomials in spatial coordinates that are of degree not exceeding d,
    where
      M is a minimum stencil size; and
      d is a degree of a polynomial;
    wherein the act of selecting discretization points in a spatial domain S on a regular lattice further comprises an act of selecting points such that they are on a lattice selected from a group consisting of a square lattice and a triangular lattice;
  further comprising an act of discretizing the propagation operator $L_{\Delta t}$ for each bulk point according to the following:

$$(L_{\Delta t}\psi)(x, y, t) \approx \sum_{ij} \hat{L}_{ij}(\tau)\psi(x + i\Delta x, y + j\Delta x, t),$$

where
    $(L_{\Delta t}\psi)(x, y, t) = L_{\Delta t}(x, y, t)[\psi(x, y, t)];$
    $L_{\Delta t}(x, y, t)$ is a propagation operator in space and time dimensions;
    $\psi(x, y, t)$ is a field operand in two dimension spaces, and one time dimension;
    $\hat{L}_{ij}(\tau)$ is a discretized propagation operator, which is set to M numbers, which are values of numbers to provide symmetry with respect to any selected point i,j on a grid, with $\tau = \Delta t/\Delta x$;
    $\psi(x+i\Delta x, y+j\Delta x, t)$ is a discretized field $\psi(x, y, t)$ in two dimensions of space;
    $i\Delta x$ is a first spatial coordinate in a first direction, where i is an integer valued first grid coordinate number representing a specific point in a bulk region;
    $j\Delta x$ is a second spatial coordinate in second direction, where j is an integer valued second grid coordinate number representing the specific point in a bulk region; and
    $\Delta x$ is a spatial discretization interval;
  wherein the act of computing a discretization of the propagation operator for each of the border points further comprises an act of computing a discretization according to the following:

$$(L_{\Delta t}\psi)(x_b, y_b) \approx \sum_{neighbors(x,y)} \hat{L}_{ij}(x_b, y_b)\psi(x, y)$$

where:
    $(L_{\Delta t}\psi)(x_b, y_b)$ is the field resulting from the application of the propagation operator evaluated at the border point $(x_b, y_b)$;
    $L_{\Delta t}(x, y)$ is a propagation operator in two dimension spaces x and y;
    $\psi(x, y)$ is a field operand in two dimension spaces x and y, which acts as an operator for the operand $(x_b, y_b)$;
    $x_b$ is a border point in a first dimension;
    $y_b$ is a border point in a second dimension;
    x and y are neighbor points of the border points $x_b$ and $y_b$;
    $\hat{L}_{ij}(x_b, y_b)$ is a discretized propagation operator at border points; and
    $\psi(x, y)$ is a representation of a field in two dimension space for neighbor points x, y;

further comprising an act of discretizing boundary conditions according to the following:

$$\sum_i b_{li}\psi(\vec{x}_i) = c_l,$$

where:
$b_{li}$ are an expression of boundary conditions;
$\psi(\vec{x}_i)$ represents tabulation of a field at discretization points $\vec{x}_i$ on the boundary;
$c_l$ represents a homogeneous boundary condition if equal to zero, and non-homogeneous boundary condition otherwise;
l labels points on the boundary; and
i labels points near the boundary;
wherein the act of decomposing an outer product of constraint vectors for efficient application of the projection operator further comprises an act of decomposing the outer product according to the following:

$B_{lm} = \Sigma b_{li} b_{mi}$, where:
$B_{lm}$ is an coefficient matrix; and
$b_{li}$ is an expression of the boundary conditions;
wherein the act of decomposing an outer product of constraint vectors for efficient application of the projection operator, further comprises an act of applying the projection operator to a particular vector $\psi$ by solving for coefficient $\alpha_l$ according to the following:

$$\sum_m B_{lm}\alpha_m = c_l - \sum_i b_{li}\psi(\vec{x}_i),$$

and making a replacement according to the following:

$$\psi(\vec{x}_i) \leftarrow \psi(\vec{x}_i) + \sum_i \alpha_l b_{li}.$$

13. A system for numerical simulation of wave propagation in a media, the system comprising a processor configured to perform operations of:
discretizing propagation operators $L_{\Delta t}$ by using an identity that is derived using central differencing in time;
providing a high-order discretization of a boundary projection operator that enforces boundary conditions independent of the discretization of the propagation operators $L_{\Delta t}$; and
alternating an application of a discretization of an evolution formula having a spatial filtering operator $L_0$ with a boundary projection operation for stepping forward in time to determine wave propagation in the media; and
generating a simulation of wave propagation in the media.

14. The system as set forth in claim 13, wherein when discretizing the propagation operator $L_{\Delta t}$, the system is further configured to perform operations of:
selecting a set of suitable functions for which discretization of the propagation operator $L_{\Delta t}$ is exact;
determining a minimum stencil size M for which a free-space discretization is stable;
selecting discretization points in a spatial domain S on a regular lattice;
classifying the discretization points as either bulk points or border points, with the bulk points being those for which each point on a stencil of the propagation operator corresponds to a discretization point on the lattice, and border points are those points that remain;
computing a discretization of the propagation operator for each of the border points using the border point and its neighbor points;
selecting points on a boundary, and using neighboring discretization points, computing differentiators and extrapolators to the selected points on the boundary for a selected boundary condition; and
decomposing an outer product of constraint vectors for efficient application of the projection operator.

15. The system as set forth in claim 14, wherein when selecting a suitable function set for which discretization of the propagation operator $L_{\Delta t}$ is exact, the system is further configured to perform an operation of selecting polynomials of degrees not exceeding a value d, where d is a degree of the polynomial.

16. The system as set forth in claim 14, wherein when determining a minimum stencil size M for which a free space discretization is stable, the system is further configured to perform an operation of setting M to a value greater than or equal to the number of linearly independent polynomials in spatial coordinates that are of degree not exceeding d,
where
M is a minimum stencil size; and
d is a degree of a polynomial.

17. The system as set forth in claim 14, wherein when selecting discretization points in a spatial domain S on a regular lattice, the system is further configured to perform an operation of selecting points such that they are on a lattice selected from a group consisting of a square lattice and a triangular lattice.

18. The system as set forth in claim 14, wherein the system is further configured to perform an operation of discretizing the propagation operator $L_{\Delta t}$ for each bulk point according to the following:

$$(L_{\Delta t}\psi)(x, y, t) \approx \sum_{ij} \hat{L}_{ij}(\tau)\psi(x + i\Delta x, y + j\Delta x, t),$$

where $(L_{\Delta t}\psi)(x, y, t) = L_{\Delta t}(x, y, t)[\psi(x, y, t)]$;

$L_{\Delta t}(x, y, t)$ is a propagation operator in space and time dimensions;
$\psi(x, y, t)$ is a field operand in two dimension spaces, and one time dimension;
$\hat{L}_{ij}(\tau)$ is a discretized propagation operator, which is set to M numbers, which are values of numbers to provide symmetry with respect to any selected point ij on a grid, with $\tau = \Delta t/\Delta x$;
$\psi(x+i\Delta x, y+j\Delta x, t)$ is a discretized field $\psi(x, y, t)$ in two dimensions of space;
$i\Delta x$ is a first spatial coordinate in a first direction, where i is an integer valued first grid coordinate number representing a specific point in a bulk region;
$j\Delta x$ is a second spatial coordinate in second direction, where j is an integer valued second grid coordinate number representing the specific point in a bulk region; and
$\Delta x$ is a spatial discretization interval.

19. The system as set forth in claim 14, wherein when computing a discretization of the propagation operator for each of the border points, the system is further configured to perform an operation of computing a discretization according to the following:

$$(L_{\Delta t}\psi)(x_b, y_b) \approx \sum_{neighbors(x,y)} \hat{L}_{ij}(x_b, y_b)\psi(x, y)$$

where:
- $(L_{\Delta t}\psi)(x_b, y_b)$ is the field resulting from the application of the propagation operator evaluated at the border point $(x_b, y_b)$;
- $L_{\Delta t}(x, y)$ is a propagation operator in two dimension spaces x and y;
- $\psi(x, y)$ is a field operand in two dimension spaces x and y, which acts as an operator for the operand $(x_b, y_b)$;
- $x_b$ is a border point in a first dimension;
- $y_b$ is a border point in a second dimension;
- x and y are neighbor points of the border points $x_b$ and $y_b$;
- $\hat{L}_{ij}(x_b, y_b)$ is a discretized propagation operator at border points; and
- $\psi(x, y)$ is a representation of a field in two dimension space for neighbor points x, Y.

20. The system as set forth in claim 14, wherein the system is further configured to perform an operation of discretizing boundary conditions according to the following:

$$\sum_i b_{li}\psi(\vec{x}_i) = c_l,$$

where:
- $b_{li}$ are an expression of boundary conditions;
- $\psi(\vec{x}_i)$ represents tabulation of a field at discretization points $\vec{x}_i$ on the boundary;
- $c_l$ represents a homogeneous boundary condition if equal to zero, and non-homogeneous boundary condition otherwise;
- l labels points on the boundary; and
- i labels points near the boundary.

21. The system as set forth in claim 14, wherein when decomposing an outer product of constraint vectors for efficient application of the projection operator, the system is further configured to perform an operation of decomposing the outer product according to the following:

$$B_{lm} = \Sigma b_{li}b_{mi},$$

where:
- $B_{lm}$ is an coefficient matrix; and
- $b_{li}$ is an expression of the boundary conditions.

22. The system as set forth in claim 14, wherein when decomposing an outer product of constraint vectors for efficient application of the projection operator, the system is further configured to perform an operation of applying the projection operator to a particular vector $\psi$ by solving for coefficient $\alpha_l$ according to the following:

$$\sum_m B_{lm}\alpha_m = c_l - \sum_i b_{li}\psi(\vec{x}_i),$$

and making a replacement according to the following:

$$\psi(\vec{x}_i) \leftarrow \psi(\vec{x}_i) + \sum_i \alpha_l b_{li}.$$

23. The system as set forth in claim 13, wherein when discretizing propagation operators $L_{\Delta t}$ by using an identity, the system is further configured to perform an operation of using the identity of $$\frac{1}{2}[\psi(\vec{x}, \Delta t) + \psi(\vec{x}, \Delta t)] =$$

$$L_{\Delta t}\psi(\vec{x}, 0) \equiv \cosh\sqrt{(\Delta t)^2 \nabla^2} \, \psi(\vec{x}, 0) = \sum_{m=0}^{\infty} \frac{(\Delta t)^{2m}\nabla^{2m}}{(2m!)}\psi(\vec{x}, 0);$$

where an exact relation that relates fields $\psi(\vec{x},t)$ at multiple times without approximations is provided;
wherein the act of providing a high-order discretization of a boundary projection operator further comprises an act of using the boundary projection operator of $$\psi(\vec{x},t) \leftarrow P_b\psi(\vec{x}, t); \text{ and}$$

wherein alternating an application of a discretization of an evolution formula having a spatial filtering operator $L_0$ further comprises an act of using the spatial filtering operator $L_0$ of $$\psi(\vec{x},\Delta t) = 2L_{\Delta t}\psi(\vec{x},\Delta t) - L_0\psi(\vec{x}, t-\Delta t),$$

with a boundary projection operation for stepping forward in time to determine wave propagation in the media;
where $$\nabla^2 = \frac{\partial^2}{\partial x^2} + \frac{\partial^2}{\partial y^2} + \frac{\partial^2}{\partial z^2}$$

denotes Laplace operator,
$\psi(\vec{x}, \Delta t)$ is a field quantity,
$\vec{x}$ is dimensions of space in x, y, and z direction,
$\Delta t$ is an increment of time,
m is an index of summation,
$L_0$ is a high-order spatial filtering operator, and
$P_b$ is the boundary projection operator at a boundary b.

24. The system as set forth in claim 23, wherein when discretizing the propagation operator $L_{\Delta t}$, the system is further configured to perform operations of:
selecting a set of suitable functions for which discretization of the propagation operator $L_{\Delta t}$ is exact;
determining a minimum stencil size M for which a free-space discretization is stable;
selecting discretization points in a spatial domain S on a regular lattice;
classifying the discretization points as either bulk points or border points, with the bulk points being those for which each point on a stencil of the propagation operator corresponds to a discretization point on the lattice, and border points are those points that remain;
computing a discretization of the propagation operator for each of the border points using the border point and its neighbor points;
selecting points on a boundary, and using neighboring discretization points, computing differentiators and extrapolators to the selected points on the boundary for a selected boundary condition;

decomposing an outer product of constraint vectors for efficient application of the projection operator;

wherein when selecting a suitable function set for which discretization of the propagation operator $L_{\Delta t}$ is exact, the system is further configured to select polynomials of degrees not exceeding a value d, where d is a degree of the polynomial;

wherein when determining a minimum stencil size M for which a free space discretization is stable, the system is further configured to perform an operation of setting M to a value greater than or equal to the number of linearly independent polynomials in spatial coordinates that are of degree not exceeding d, where M is a minimum stencil size; and d is a degree of a polynomial;

wherein when selecting discretization points in a spatial domain S on a regular lattice, the system is further configured to select points such that they are on a lattice selected from a group consisting of a square lattice and a triangular lattice;

wherein the system is further configured to perform an operation of discretizing the propagation operator $L_{\Delta t}$ for each bulk point according to the following:

$$(L_{\Delta t}\psi)(x, y, t) \approx \sum_{ij} \hat{L}_{ij}(\tau)\psi(x + i\Delta x, y + j\Delta x, t),$$

where $(L_{\Delta t}\psi)(x, y, t) \equiv L_{\Delta t}(x, y, t)[\psi(x, y, t)]$;

$L_{\Delta t}(x, y, t)$ is a propagation operator in space and time dimensions;

$\psi(x, y, t)$ is a field operand in two dimension spaces, and one time dimension;

$\hat{L}_{ij}(\tau)$ is a discretized propagation operator, which is set to M numbers, which are values of numbers to provide symmetry with respect to any selected point i,j on a grid, with $\tau = \Delta t / \Delta x$;

$\psi(x+i\Delta x, y+j\Delta x, t)$ is a discretized field $\psi(x, y, t)$ in two dimensions of space;

$i\Delta x$ is a first spatial coordinate in a first direction, where i is an integer valued first grid coordinate number representing a specific point in a bulk region;

$j\Delta x$ is a second spatial coordinate in second direction, where j is an integer valued second grid coordinate number representing the specific point in a bulk region; and $\Delta x$ is a spatial discretization interval;

wherein when computing a discretization of the propagation operator for each of the border points, the system is further configured to perform an operation of computing a discretization according to the following:

$$(L_{\Delta t}\psi)(x_b, y_b) \approx \sum_{neighbors(x,y)} \hat{L}_{ij}(x_b, y_b)\psi(x, y)$$

where:

$(L_{\Delta t}\psi)(x_b, y_b)$ is the field resulting from the application of the propagation operator evaluated at the border point $(x_b, y_b)$;

$L_{\Delta t}(x, y)$ is a propagation operator in two dimension spaces x and y;

$\psi(x, y)$ is a field operand in two dimension spaces x and y, which acts as an operator for the operand $(x_b, y_b)$;

$x_b$ is a border point in a first dimension;

$y_b$ is a border point in a second dimension;

x and y are neighbor points of the border points Xb and Yb;

$\hat{L}_{ij}(x_b, y_b)$ is a discretized propagation operator at border points; and $\psi(x, y)$ is a representation of a field in two dimension space for neighbor points x, y;

wherein the system is further configured to perform an operation of discretizing boundary conditions according to the following:

$$\sum_i b_{li}\psi(\vec{x}_i) = c_l,$$

where:

$b_{li}$ are an expression of boundary conditions;

$\psi(\vec{x}_i)$ represents tabulation of a field at discretization points $\vec{x}_i$ on the boundary;

$c_l$ represents a homogeneous boundary condition if equal to zero, and non-homogeneous boundary condition otherwise;

l labels points on the boundary; and i labels points near the boundary;

wherein when decomposing an outer product of constraint vectors for efficient application of the projection operator, the system is further configured to perform an operation of decomposing the outer product according to the following:

$$B_{lm} \equiv \Sigma b_{li} b_{mi},$$

where:

$B_{lm}$ is an coefficient matrix; and $b_{li}$ is an expression of the boundary conditions; and wherein when decomposing an outer product of constraint vectors for efficient application of the projection operator, the system is further configured to apply the projection operator to a particular vector $\psi$ by solving for coefficient $\alpha_l$ according to the following:

$$\sum_m B_{lm}\alpha_m = c_l - \sum_i b_{li}\psi(\vec{x}_i),$$

and making a replacement according to the following:

$$\psi(\vec{x}_i) \leftarrow \psi(\vec{x}_i) + \sum_l \alpha_l b_{li}.$$

25. A computer program product for numerical simulation of wave propagation in a media, the computer program product comprising computer-readable instruction means encoded on a computer-readable medium and executable by a computer for causing a computer to perform operations of:

discretizing propagation operators $L_{\Delta t}$ by using an identity that is derived using central differencing in time;

providing a high-order discretization of a boundary projection operator that enforces boundary conditions independent of the discretization of the propagation operators $L_{\Delta t}$; and alternating an application of a discretization of an evolution formula having a spatial filtering operator $L_0$ with a boundary projection operation for stepping forward in time to determine wave propagation in the media; and generating a simulation of wave propagation in the media.

26. The computer program product as set forth in claim 25, wherein when discretizing the propagation operator $L_{\Delta t}$, the computer program product further includes instruction means for causing a computer to perform operations of:

selecting a set of suitable functions for which discretization of the propagation operator $L_{\Delta t}$ is exact;

determining a minimum stencil size M for which a free-space discretization is stable;

selecting discretization points in a spatial domain S on a regular lattice;

classifying the discretization points as either bulk points or border points, with the bulk points being those for which each point on a stencil of the propagation operator corresponds to a discretization point on the lattice, and border points are those points that remain;

computing a discretization of the propagation operator for each of the border points using the border point and its neighbor points;

selecting points on a boundary, and using neighboring discretization points, computing differentiators and extrapolators to the selected points on the boundary for a selected boundary condition; and decomposing an outer product of constraint vectors for efficient application of the projection operator.

27. The computer program product as set forth in claim 26, wherein when selecting a suitable function set for which discretization of the propagation operator $L_{\Delta t}$ is exact, the computer program product further includes instruction means for causing a computer to perform an operation of selecting polynomials of degrees not exceeding a value d, where d is a degree of the polynomial.

28. The computer program product as set forth in claim 26, wherein when determining a minimum stencil size M for which a free space discretization is stable, the computer program product further includes instruction means for causing a computer to perform an operation of setting M to a value greater than or equal to the number of linearly independent polynomials in spatial coordinates that are of degree not exceeding d, where M is a minimum stencil size; and d is a degree of a polynomial.

29. The computer program product as set forth in claim 26, wherein when selecting discretization points in a spatial domain S on a regular lattice, the computer program product further includes instruction means for causing a computer to perform an operation of selecting points such that they are on a lattice selected from a group consisting of a square lattice and a triangular lattice.

30. The computer program product as set forth in claim 26, wherein the computer program product further includes instruction means for causing a computer to perform an operation of discretizing the propagation operator $L_{\Delta t}$ for each bulk point according to the following:

$$(L_{\Delta t}\psi)(x, y, t) \approx \sum_{ij} \hat{L}_{ij}(\tau)\psi(x + i\Delta x, y + j\Delta x, t),$$

where $(L_{\Delta t}\psi)(x, y, t) = L_{\Delta t}(x, y, t)[\psi(x, y, t)];$ $L_{\Delta t}(x, y, t)$ is a propagation operator in space and time dimensions;

$\psi(x, y, t)$ is a field operand in two dimension spaces, and one time dimension;

$\hat{L}_{ij}(\tau)$ is a discretized propagation operator, which is set to M numbers, which are values of numbers to provide symmetry with respect to any selected point i,j on a grid, with $\tau=\Delta t/\Delta x$;

$\psi(x+i\Delta x, y+j\Delta x, t)$ is a discretized field $\psi(x, y, t)$ in two dimensions of space;

$i\Delta x$ is a first spatial coordinate in a first direction, where i is an integer valued first grid coordinate number representing a specific point in a bulk region;

$j\Delta x$ is a second spatial coordinate in second direction, where j is an integer valued second grid coordinate number representing the specific point in a bulk region; and $\Delta x$ is a spatial discretization interval.

31. The computer program product as set forth in claim 26, wherein when computing a discretization of the propagation operator for each of the border points, the computer program product further includes instruction means for causing a computer to perform an operation of computing a discretization according to the following:

$$(L_{\Delta t}\psi)(x_b, y_b) \approx \sum_{neighbors(x,y)} \hat{L}_{ij}(x_b, y_b)\psi(x, y)$$

where:

$(L_{\Delta t}\psi)(x_b, y_b)$ is the field resulting from the application of the propagation operator evaluated at the border point $(x_b, y_b)$;

$L_{\Delta t}(x, y)$ is a propagation operator in two dimension spaces x and y;

$\psi(x, y)$ is a field operand in two dimension spaces x and y, which acts as an operator for the operand $(x_b, y_b)$;

$x_b$ is a border point in a first dimension;

$y_b$ is a border point in a second dimension;

x and y are neighbor points of the border points $x_b$ and $y_b$;

$\hat{L}_{ij}(x_b, y_b)$ is a discretized propagation operator at border points; and $\psi(x, y)$ is a representation of a field in two dimension space for neighbor points x, y.

32. The computer program product as set forth in claim 26, the computer program product further includes instruction means for causing a computer to perform an operation of discretizing boundary conditions according to the following:

$$\sum_i b_{li}\psi(\vec{x}_i) = c_l,$$

where:

$b_{li}$ are an expression of boundary conditions;

$\psi(\vec{x}_i)$ represents tabulation of a field at discretization points $\vec{x}_i$ on the boundary;

$c_l$ represents a homogeneous boundary condition if equal to zero, and non-homogeneous boundary condition otherwise;

l labels points on the boundary; and i labels points near the boundary.

33. The computer program product as set forth in claim 26, wherein when decomposing an outer product of constraint vectors for efficient application of the projection operator, the computer program product further includes instruction means for causing a computer to perform an operation of decomposing the outer product according to the following:

$$B_{lm} = \Sigma b_{li} b_{mi},$$

where:

$B_{lm}$ is an coefficient matrix; and $b_{li}$ is an expression of the boundary conditions.

34. The computer program product as set forth in claim 26, wherein when decomposing an outer product of constraint vectors for efficient application of the projection operator, the computer program product further includes instruction means for causing a computer to perform an operation of applying the projection operator to a particular vector $\psi$ by solving for coefficient $\alpha_l$ according to the following:

$$\sum_m B_{lm}\alpha_m = c_l - \sum_i b_{li}\psi(\vec{x}_i),$$

and making a replacement according to the following:

$$\psi(\vec{x}_i) \leftarrow \psi(\vec{x}_i) + \sum_i \alpha_l b_{li}.$$

35. The computer program product as set forth in claim 25, wherein when discretizing propagation operators $L_{\Delta t}$ by using an identity, the computer program product further includes instruction means for causing a computer to perform an operation of using the identity of $$\frac{1}{2}[\psi(\vec{x}, \Delta t) + \psi(\vec{x}, \Delta t)] =$$

$$L_{\Delta t}\psi(\vec{x}, 0) \equiv \cosh\sqrt{(\Delta t)^2 \nabla^2}\ \psi(\vec{x}, 0) = \sum_{m=0}^{\infty} \frac{(\Delta t)^{2m}\nabla^{2m}}{(2m!)}\psi(\vec{x}, 0);$$

where an exact relation that relates fields $\psi(\vec{x},t)$ at multiple times without approximations is provided;

wherein the act of providing a high-order discretization of a boundary projection operator further comprises an act of using the boundary projection operator of $\psi(\vec{x},t) \leftarrow P_b\psi(\vec{x},t)$; and wherein alternating an application of a discretization of an evolution formula having a spatial filtering operator $L_0$ further comprises an act of using the spatial filtering operator $L_0$ of $\psi(\vec{x},\Delta t) = 2L_{\Delta t}\psi(\vec{x},\Delta t) - L_0\psi(\vec{x},t-\Delta t),$ with a boundary projection operation for stepping forward in time to determine wave propagation in the media;

where $$\nabla^2 = \frac{\partial^2}{\partial x^2} + \frac{\partial^2}{\partial y^2} + \frac{\partial^2}{\partial z^2}$$

denotes Laplace operator, $\psi(\vec{x}, \Delta t)$ is a field quantity, $\vec{x}$ is dimensions of space in x, y, and z direction, $\Delta t$ is an increment of time, m is an index of summation, $L_0$ is a high-order spatial filtering operator, and $P_b$ is the boundary projection operator at a boundary b.

36. The computer program product as set forth in claim 35, wherein when discretizing the propagation operator $L_{\Delta t}$, the computer program product further includes instruction means for causing a computer to perform operations of:

selecting a set of suitable functions for which discretization of the propagation operator $L_{\Delta t}$ is exact;

determining a minimum stencil size M for which a free-space discretization is stable;

selecting discretization points in a spatial domain S on a regular lattice;

classifying the discretization points as either bulk points or border points, with the bulk points being those for which each point on a stencil of the propagation operator corresponds to a discretization point on the lattice, and border points are those points that remain;

computing a discretization of the propagation operator for each of the border points using the border point and its neighbor points;

selecting points on a boundary, and using neighboring discretization points, computing differentiators and extrapolators to the selected points on the boundary for a selected boundary condition;

decomposing an outer product of constraint vectors for efficient application of the projection operator;

wherein when selecting a suitable function set for which discretization of the propagation operator $L_{\Delta t}$ is exact, the computer program product further includes instruction means for causing a computer to perform an operation of setting polynomials of degrees not exceeding a value d, where d is a degree of the polynomial;

wherein when determining a minimum stencil size M for which a free space discretization is stable, the computer program product further includes instruction means for causing a computer to perform an operation of setting M to a value greater than or equal to the number of linearly independent polynomials in spatial coordinates that are of degree not exceeding d, where M is a minimum stencil size; and d is a degree of a polynomial;

wherein when selecting discretization points in a spatial domain S on a regular lattice, the computer program product further includes instruction means for causing a computer to perform an operation of selecting points such that they are on a lattice selected from a group consisting of a square lattice and a triangular lattice;

wherein the computer program product further includes instruction means for causing a computer to perform an operation of discretizing the propagation operator $L_{\Delta t}$ for each bulk point according to the following:

$$(L_{\Delta t}\psi)(x, y, t) \approx \sum_{ij} \hat{L}_{ij}(\tau)\psi(x + i\Delta x, y + j\Delta x, t),$$

where $(L_{\Delta t}\psi)(x, y, t) = L_{\Delta t}(x, y, t)[\psi(x, y, t)];$ $L_{\Delta t}(x, y, t)$ is a propagation operator in space and time dimensions;

$\psi(x, y, t)$ is a field operand in two dimension spaces, and one time dimension;

$\hat{L}_{ij}(\tau)$ is a discretized propagation operator, which is set to M numbers, which are values of numbers to provide symmetry with respect to any selected point i,j on a grid, with $\tau = \Delta t/\Delta x$;

$\psi(x+i\Delta x, y+j\Delta x, t)$ is a discretized field $\psi(x, y, t)$ in two dimensions of space;

$i\Delta x$ is a first spatial coordinate in a first direction, where i is an integer valued first grid coordinate number representing a specific point in a bulk region;

$j\Delta x$ is a second spatial coordinate in second direction, where j is an integer valued second grid coordinate number representing the specific point in a bulk region; and $\Delta x$ is a spatial discretization interval;

wherein when computing a discretization of the propagation operator for each of the border points, the computer program product further includes instruction means for causing a computer to perform an operation of computing a discretization according to the following:

$$(L_{\Delta t}\psi)(x_b, y_b) \approx \sum_{neighbors(x,y)} \hat{L}_{ij}(x_b, y_b)\psi(x, y)$$

where:

$(L_{\Delta t}\psi)(x_b, y_b)$ is the field resulting from the application of the propagation operator evaluated at the border point $(x_b, y_b)$;

$L_{\Delta t}(x, y)$ is a propagation operator in two dimension spaces x and y;

$\psi(x, y)$ is a field operand in two dimension spaces x and y, which acts as an operator for the operand $(x_b, y_b)$;

$x_b$ is a border point in a first dimension;

$y_b$ is a border point in a second dimension;

x and y are neighbor points of the border points $x_b$ and $y_b$;

$\hat{L}_{i,j}(x_b, y_b)$ is a discretized propagation operator at border points; and $\psi(x, y)$ is a representation of a field in two dimension space for neighbor points x, y;

wherein the computer program product further includes instruction means for causing a computer to perform an operation of discretizing boundary conditions according to the following:

$$\sum_i b_{li}\psi(\vec{x}_i) = c_l,$$

where:

$b_{li}$ are an expression of boundary conditions;

$\psi(\vec{x}_i)$ represents tabulation of a field at discretization points $\vec{x}_i$ on the boundary;

$c_l$ represents a homogeneous boundary condition if equal to zero, and non-homogeneous boundary condition otherwise;

l labels points on the boundary; and i labels points near the boundary;

wherein when decomposing an outer product of constraint vectors for efficient application of the projection operator, the computer program product further includes instruction means for causing a computer to perform an operation of decomposing the outer product according to the following:

$B_{lm} = \Sigma b_{li} b_{mi}$, where:

$B_{lm}$ is an coefficient matrix; and $b_{li}$ is an expression of the boundary conditions; and wherein when decomposing an outer product of constraint vectors for efficient application of the projection operator, the computer program product further includes instruction means for causing a computer to perform an operation of applying the projection operator to a particular vector $\psi$ by solving for coefficient $\alpha_l$ according to the following:

$$\sum_m B_{lm}\alpha_m = c_l - \sum_i b_{li}\psi(\vec{x}_i),$$

and making a replacement according to the following:

$$\psi(\vec{x}_i) \leftarrow \psi(\vec{x}_i) + \sum_i \alpha_l b_{li}.$$

* * * * *